(12) United States Patent
Chapdelaine-Couture et al.

(10) Patent No.: US 9,918,011 B2
(45) Date of Patent: *Mar. 13, 2018

(54) OMNISTEREO IMAGING

(71) Applicant: VALORISATION-RECHERCHE, LIMITED PARTNERSHIP, Montreal (CA)

(72) Inventors: Vincent Chapdelaine-Couture, Carignan (CA); Sébastien Roy, Montreal (CA)

(73) Assignee: VALORISATION-RECHERCHE, LIMITED PARTNERSHIP (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,413

(22) Filed: Jun. 6, 2017

(65) Prior Publication Data

US 2017/0280056 A1    Sep. 28, 2017

Related U.S. Application Data

(63) Continuation of application No. 14/817,510, filed on Aug. 4, 2015, now Pat. No. 9,706,118, which is a
(Continued)

(51) Int. Cl.
*H04N 5/232* (2006.01)
*G06K 9/20* (2006.01)
(Continued)

(52) U.S. Cl.
CPC ......... *H04N 5/23238* (2013.01); *G03B 35/08* (2013.01); *G03B 37/04* (2013.01);
(Continued)

(58) Field of Classification Search
None
See application file for complete search history.

(56) References Cited

U.S. PATENT DOCUMENTS 5,657,073 A * 8/1997 Henley ............... G03B 37/04
348/38
6,795,109 B2   9/2004 Peleg et al.
(Continued)

FOREIGN PATENT DOCUMENTS

CN    102547358 A    7/2012
JP    2012165102    8/2012

OTHER PUBLICATIONS

Anguelov et al.; "Google Street View: Capturing the World at Street Level", Computer, 43(6): 32-38, Jun. 2010.
(Continued)

*Primary Examiner* — Kevin McInnish
(74) *Attorney, Agent, or Firm* — Norton Rose Fulbright Canada LLP

(57) ABSTRACT

A method for generating a 360 degree view. N input images are captured from N cameras fixed at a baseline height equidistantly about a circle in an omnipolar camera setup where N≥3. Two epipolar lines are defined per field of view from the cameras to divide the field of view of each one of the cameras into four parts. Image portions from each one of the cameras are stitched together along vertical stitching planes passing through the epipolar lines. Regions corresponding to a visible camera are removed from the image portions using deviations performed along the epipolar lines. Output images are formed for left and right eye omnistereo views by stitching together the first one of the four parts from each one of the fields of view and the second one of the four parts from each one of the fields of view, respectively.

11 Claims, 14 Drawing Sheets

Related U.S. Application Data continuation of application No. PCT/CA2014/000092, filed on Feb. 4, 2014.

(60) Provisional application No. 61/760,383, filed on Feb. 4, 2013.

(51) Int. Cl.
| | |
|---|---|
| *G03B 35/08* | (2006.01) |
| *H04N 13/04* | (2006.01) |
| *G06T 3/00* | (2006.01) |
| *G06T 3/40* | (2006.01) |
| *H04N 13/02* | (2006.01) |
| *H04N 5/247* | (2006.01) |
| *G03B 37/04* | (2006.01) |

(52) U.S. Cl.
CPC ............ *G06K 9/209* (2013.01); *G06T 3/0006* (2013.01); *G06T 3/0018* (2013.01); *G06T 3/0062* (2013.01); *G06T 3/4038* (2013.01); *H04N 5/247* (2013.01); *H04N 13/0242* (2013.01); *H04N 13/0246* (2013.01); *H04N 13/044* (2013.01)

(56) References Cited

U.S. PATENT DOCUMENTS

| | | | |
|---|---|---|---|
| 2004/0001138 A1* | 1/2004 | Weerashinghe ... | H04N 13/0242 348/36 |
| 2006/0268130 A1 | 11/2006 | Williams et al. | |
| 2007/0014347 A1 | 1/2007 | Prechtl et al. | |
| 2008/0298674 A1 | 12/2008 | Baker et al. | |
| 2010/0141737 A1 | 6/2010 | Li et al. | |
| 2012/0154519 A1 | 6/2012 | Zargarpour et al. | |
| 2012/0154548 A1* | 6/2012 | Zargarpour ............ | G03B 35/10 348/48 |
| 2013/0141784 A1 | 6/2013 | White | |

OTHER PUBLICATIONS

P. Bourke; "Synthetic Stereoscopic Panoramic Images", Lecture Notes in Computer Science (VSMM 2006), 4270: 147-155, 2006.

P. Bourke; "Omni-directional Stereoscopic Fisheye Images for Immersive Hemispherical Dome Environments", Computer Games and Allied Technology, pp. 136-143, May 2009.

Courbon et al.; "A Generic Fisheye camera model for robotic applications", In International Conference onIntellignet Robots and Systems, pp. 1683-1688, IEEE, Oct. 2007.

Couture et al.; "Panoramic Stereo Video Textures", IEEE International Conference on Computer Vision (ICCV), Nov. 2011.

Cruz-Neira et al.; "Surround-Screen Projection-Based Virtual Reality: The Design and Implementation of the CAVE", In ACM Conference on Computer graphics and interactive techniques (SIGGRAPH), pp. 135-142, New York, NY, USA, 1993.

Cruz-Neira et al.; "The CAVE: Audio Visual Experience Automatic Virtual Environment", Communications of the ACM, 35(6): 64-72, 1992.

Huang et al.; "Panoramic Stereo Imaging System with Automatic Disparity Warping and Seaming", Graphical Models and Image Processing, 60(3): 196-208, 1998.

Ishiguro et al.; "Omni-Directional Stereo", IEEE Transactions on Pattern Analysis and Machine Intelligence, 14(2): 257-262, 1992.

D.W. Marquardt; "An Algorithm for Least-Squares Estimation of Nonlinear Parameters", SIAM Journal on Applied Mathematics (SIAP), 11:431-441, 1963.

Naemura et al.; "Multi-User Immersive Stereo", IEEE International Conference onImage Processing, 1:903, 1998.

Christian Weissig et al., "The Ultimate Immersive Experience: Panoramic 3D Video Acquisition", Springer-Verlag Berlin Heidelberg 2012, pp. 671-681.

S.K. Nayar; "Catadioptric Omnidirectional Camera", in IEEE Conference on Computer Vision and Pattern Recognition, pp. 482-488, Washington, DC, USA, 1997, IEEE Computer Society.

Peleg et al.; "Omnistereo: Panoramic Stereo Imaging", IEEE transactions on Pattern Analysis and Machine Intelligence, 23(3): 279-290, 2001.

Scaramuzza et al.; "A Flexible Technique for Accurate Omnidirectional Camera Calibration and Structure from Motion", in Proceedings of the Fourth IEEE International Conference on Computer Vision Systems, ICVS '06, pp. 45-52, Washington, DC, USA, 2006. IEEE Computer Society.

Tanaka et al.; "TONADO: Omnistereo Video Imaging with Rotating Optics", IEEE Transactions on Visualization and Computer Graphics, 11(6): 614-625, Nov. 2005.

International Search Report and Written Opinion issued on May 1, 2014 in connection with International Patent Application No. PCT/CA2014/000092.

The State Intelletual Proprety Office of The People's Republic of China Search Report, Jun. 20, 2017, 2 pages, Application No. 201480009732.5.

* cited by examiner

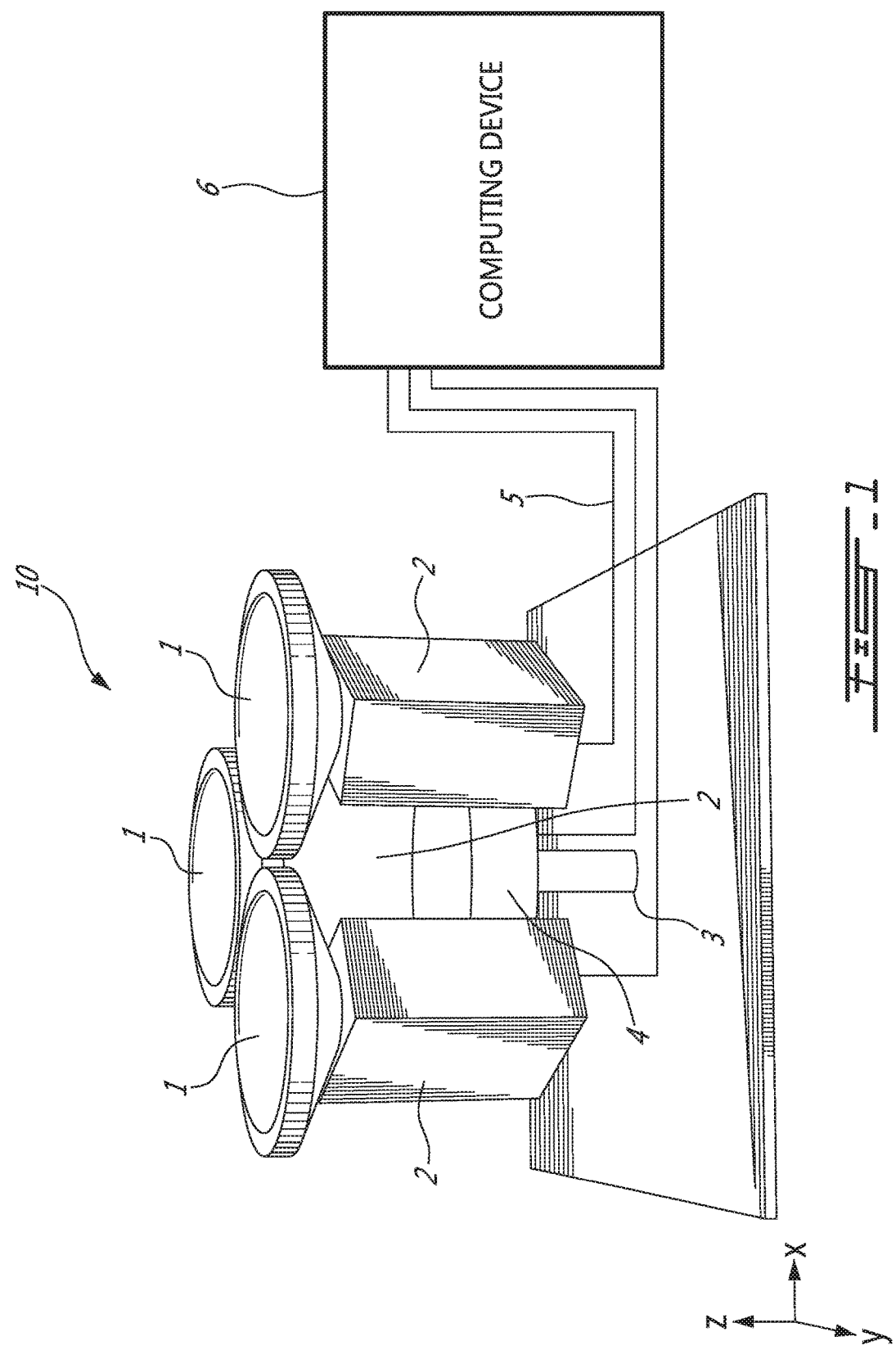

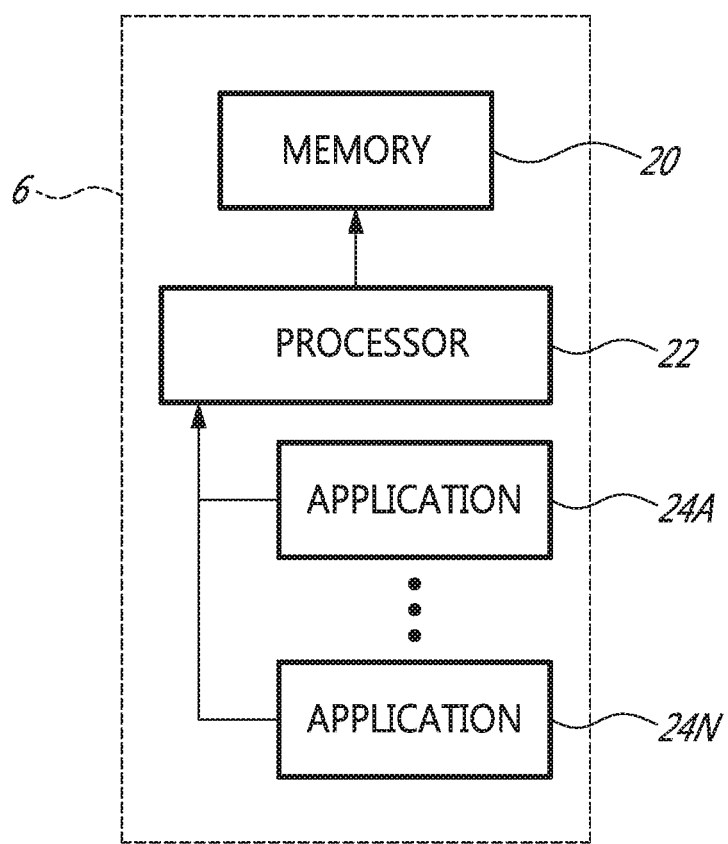

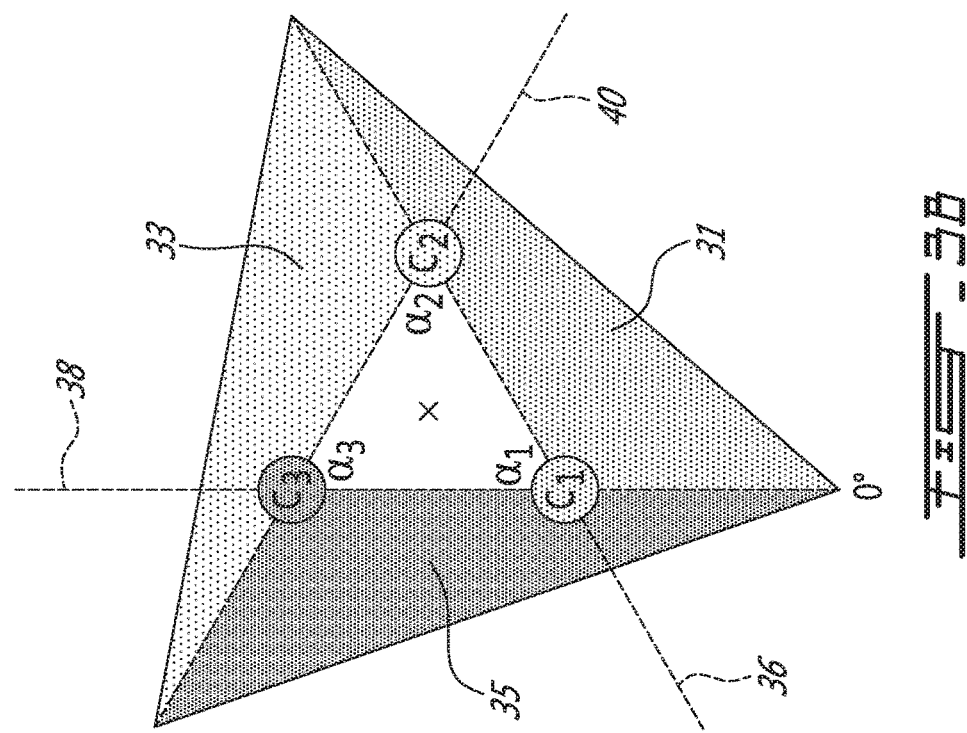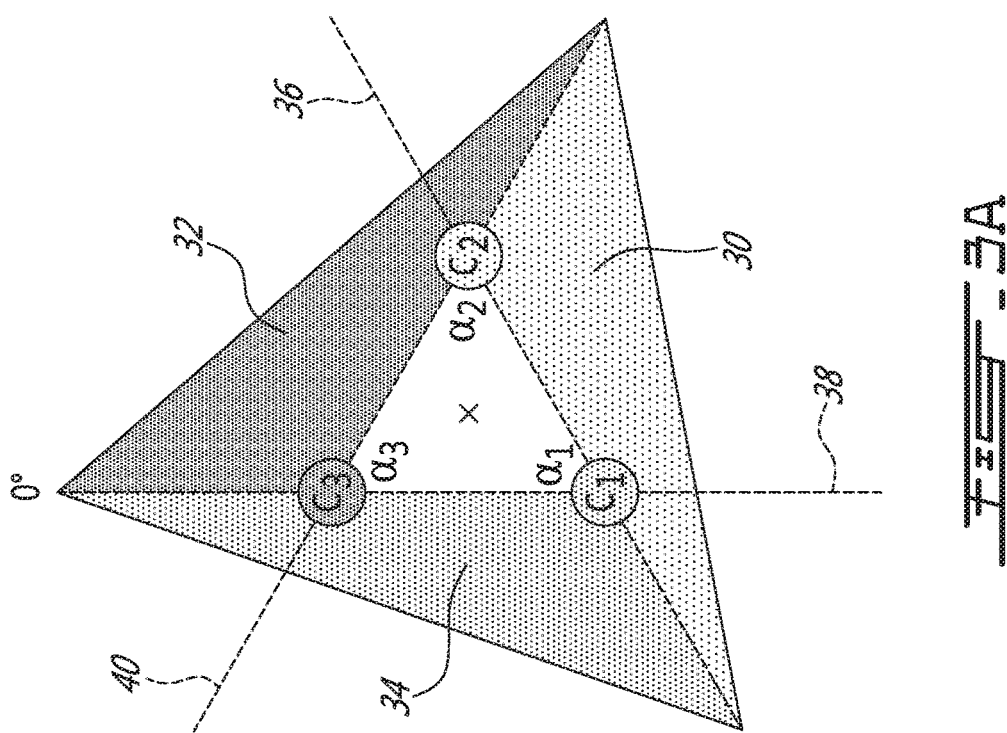

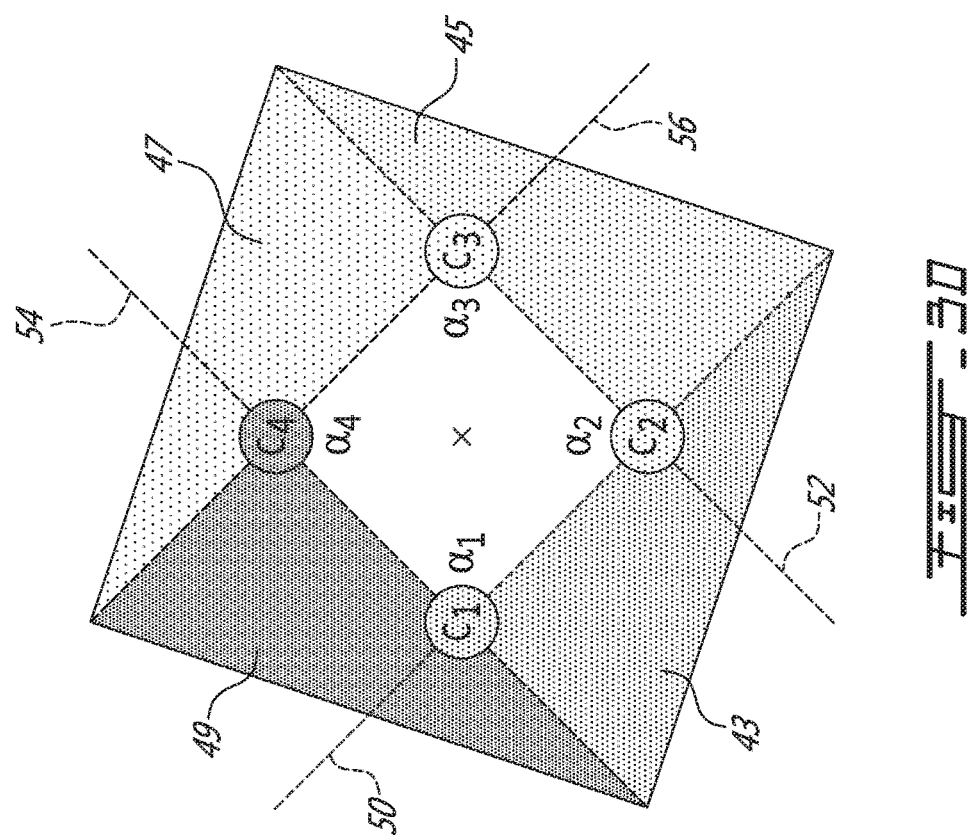
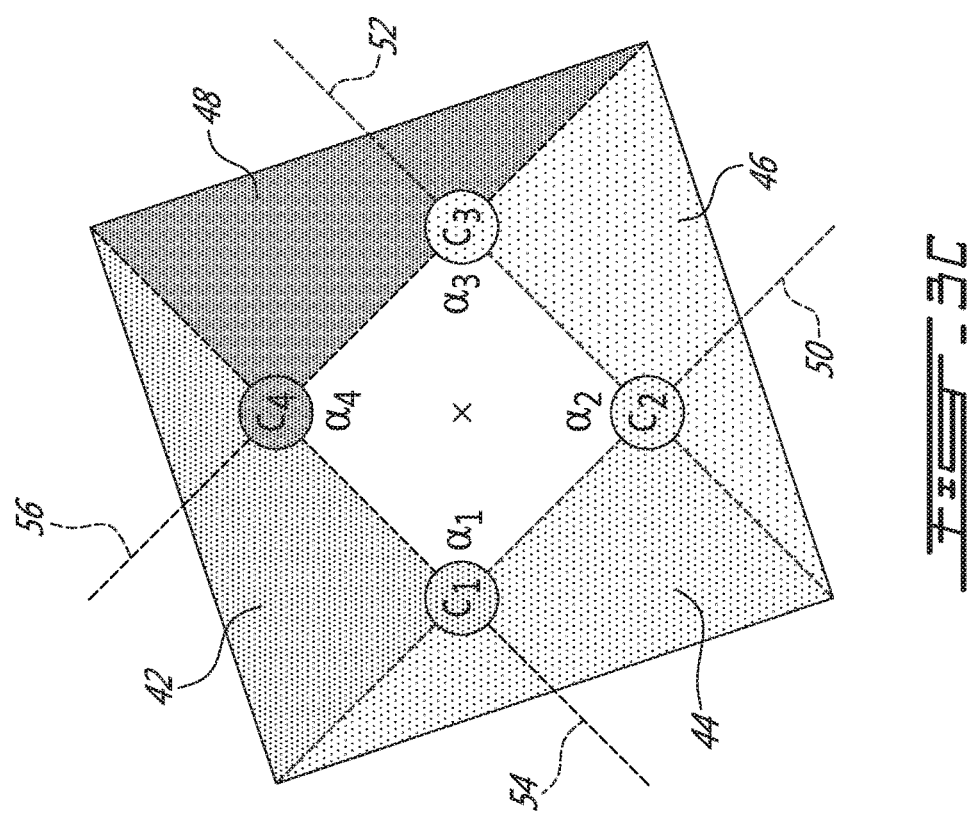

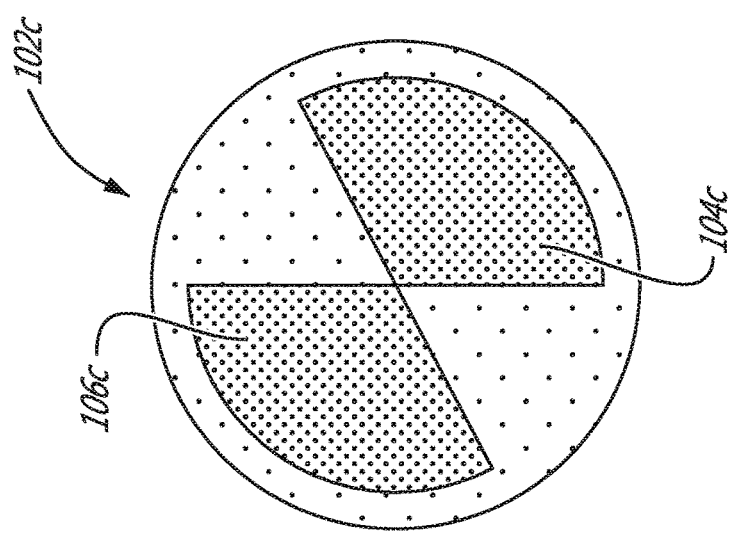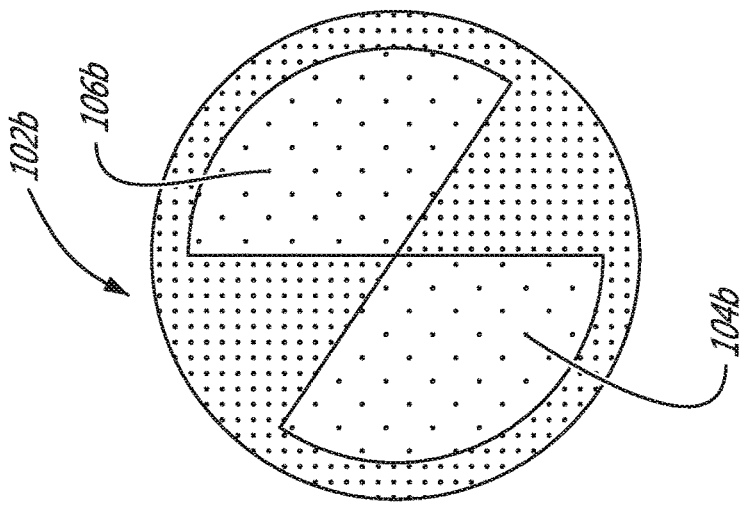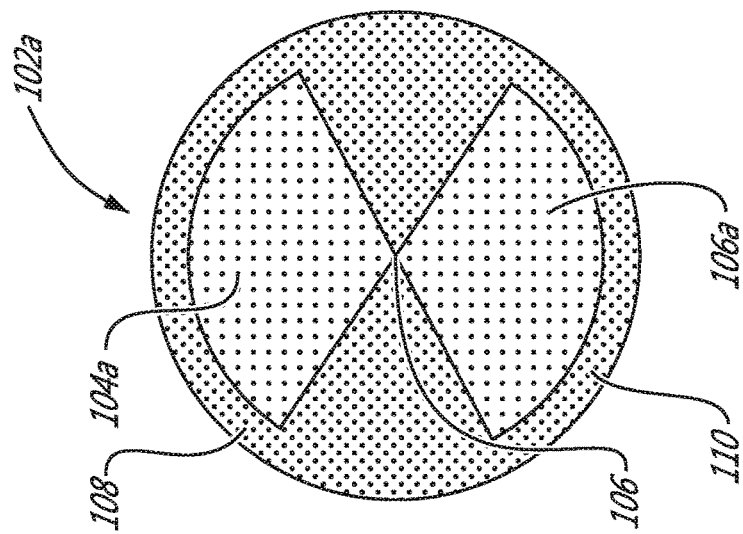
FIG. 4A

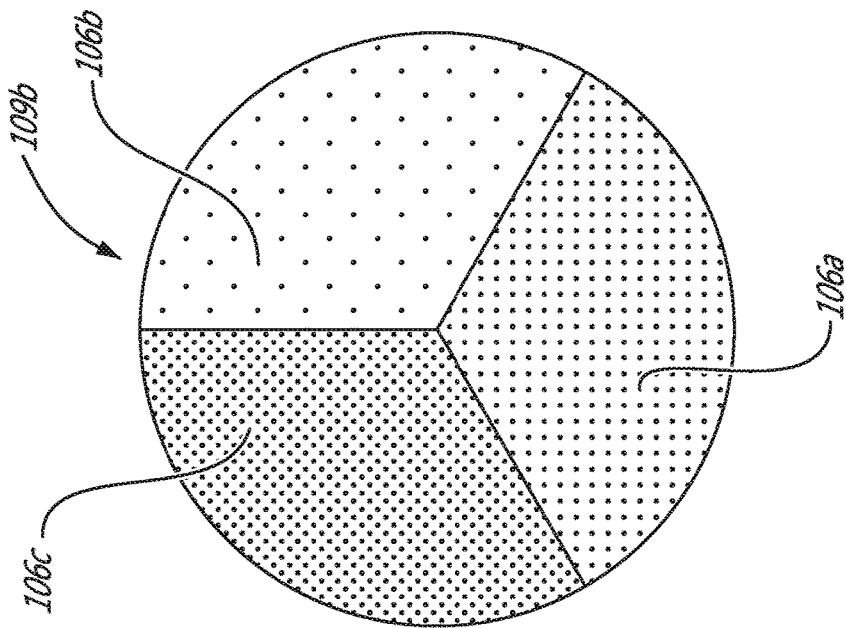
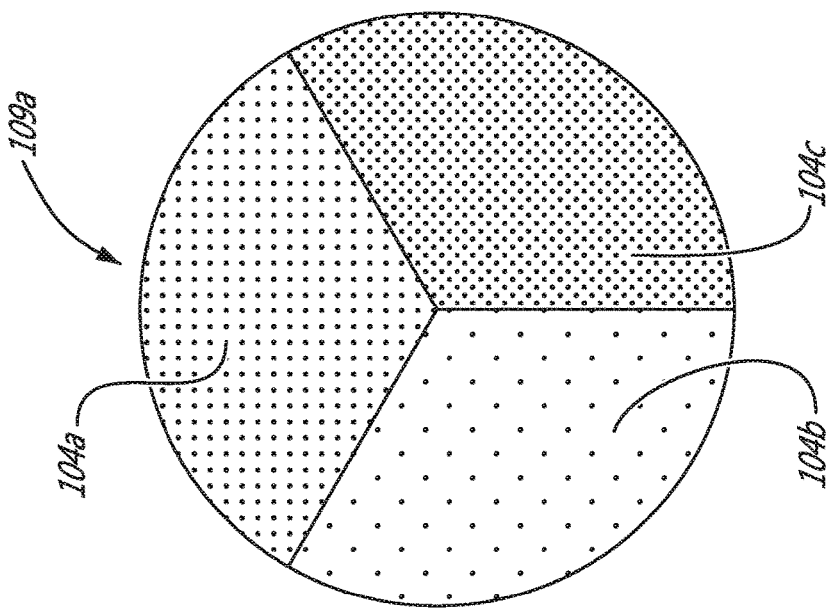
FIG. 4B

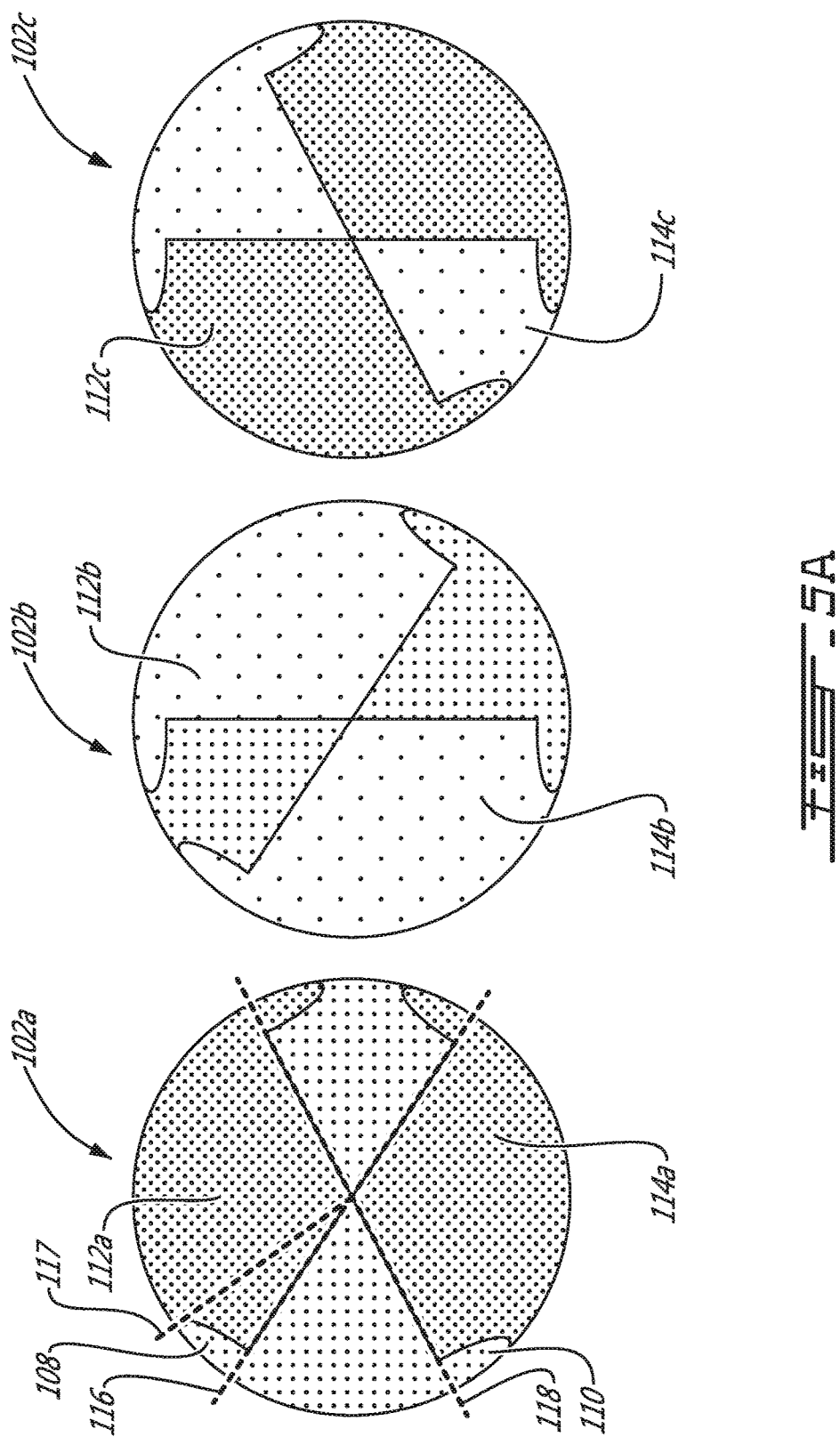

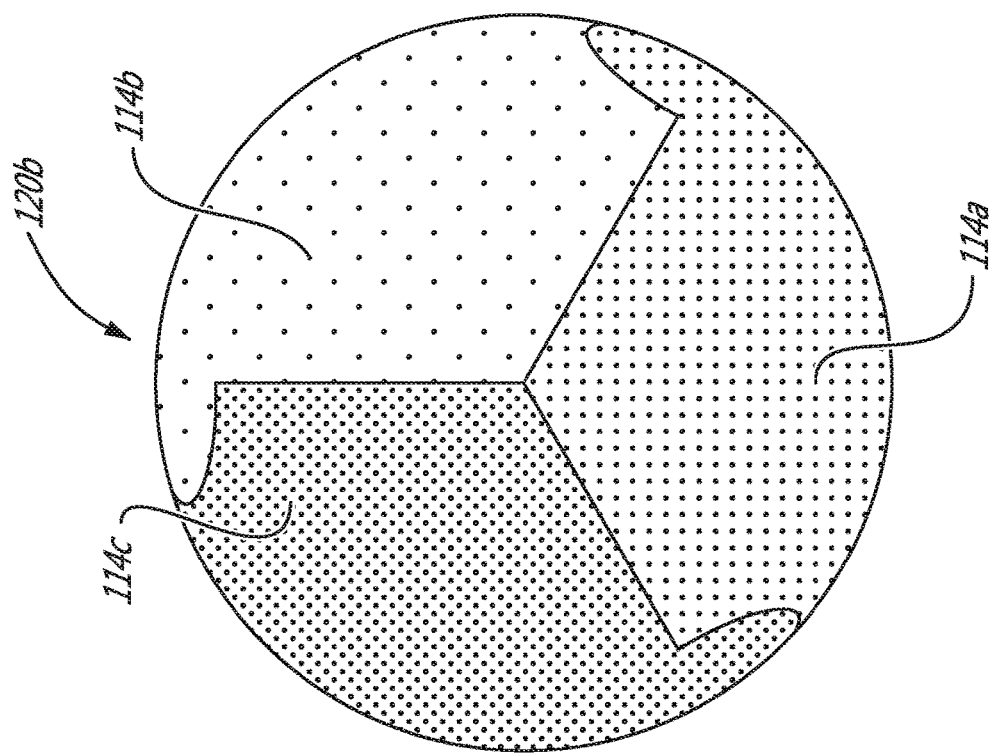
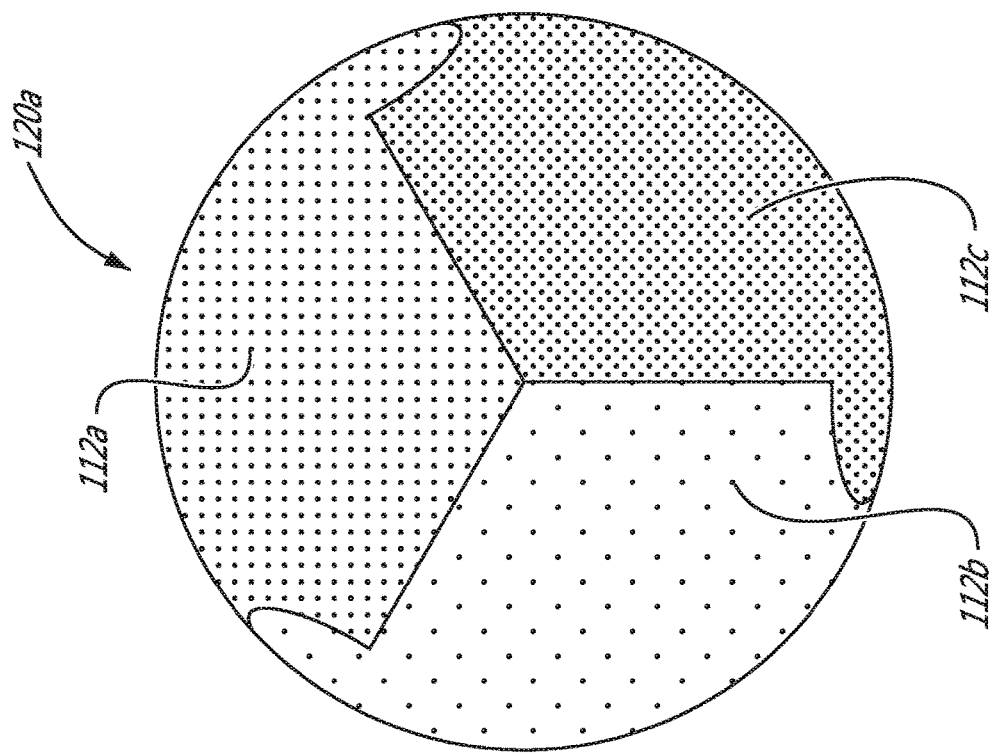
FIG. 5B

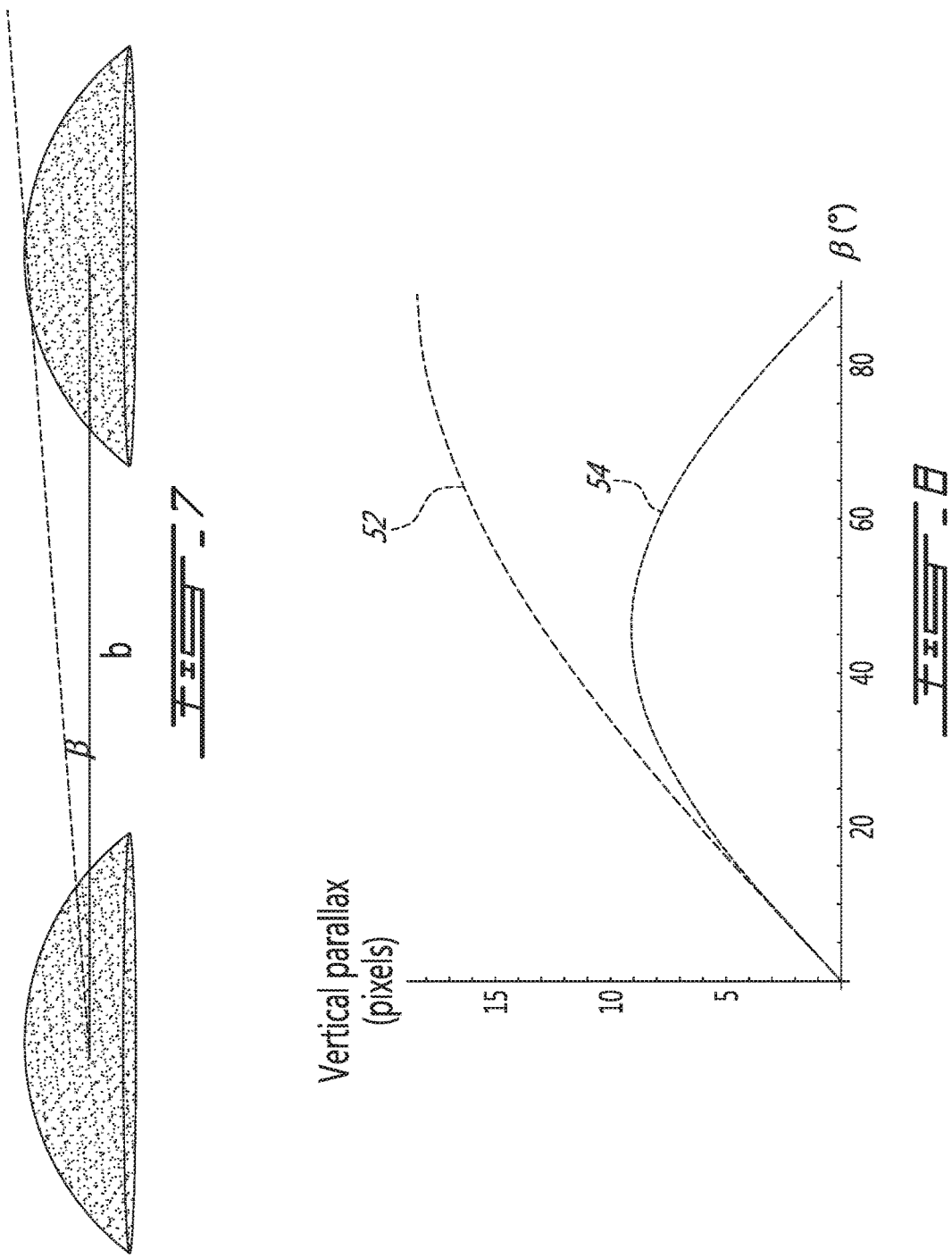

OMNISTEREO IMAGING

CROSS REFERENCE TO RELATED APPLICATIONS

The present application is a continuation of U.S. patent application Ser. No. 14/817,510 filed on Aug. 4, 2015, which is a continuation of International Application No. PCT/CA2014/000092, filed on Feb. 4, 2014, designating the United States, which itself claims the benefit of U.S. provisional Application Ser. No. 61/760,383, filed on Feb. 4, 2013, the contents of which are hereby incorporated by reference.

TECHNICAL FIELD

The present disclosure relates to the field of immersive imaging to obtain a 360 degree field of view with depth perception.

BACKGROUND OF THE ART

Traditional stereo imaging uses two cameras separated along a baseline to capture two slightly different viewpoints looking in the same direction. The stereo image pair can then be projected on a stereo display and fused by the human brain to get strong cues to scene depth.

The objective of omnistereo imaging is to provide stereo cues for up to 360 degrees around an observer. Omnistereo images can be used for navigation in a virtual environment without the need to track head orientation.

The difficulty in capturing omnistereo images is that capture cannot simply be done using two cameras side by side. Such a capture would provide maximum stereo information on the median line (perpendicular to the baseline) but not stereo information along the baseline.

SUMMARY

There is described herein a camera setup for stereo immersive (omnistereo) capture. An omnistereo pair of images gives stereo information up to 360 degrees around a central observer. The omnipolar camera setup uses a minimum of three cameras with ultra wide angle lenses. Every visible point surrounding the setup may be captured in stereo by at least two cameras in about a 180 degree field of view, from about the height of the cameras and above or the height of the cameras and below, depending on the orientation of the setup.

A stitching method takes images of the camera setup and produces an omnistereo pair of images with no horizontal misalignments due to parallax. Stitching is done at vertical planes passing by the epipoles in neighboring camera images. An unconstrained dynamic scene may be captured while the camera is travelling. The captured videos are formatted to be displayed in an omnistereo dome. The epipolar stitching method may also be used to design a high resolution monocular camera setup using standard lenses. This setup reduces misalignments due to parallax usually observed in traditional systems.

In accordance with a first broad aspect, there is provided an omnipolar imaging device comprising: at least three cameras at a baseline height and positioned substantially equidistant about a circle, each one of the at least three cameras having a wide angle lens oriented in a same direction and adapted to capture images for a portion of a field of view of substantially 360 degrees; and a mounting apparatus for retaining the at least three cameras in a fixed position.

In some embodiments, the device further comprises a processing device for receiving the captured images from the at least three cameras and stitching together portions of the captured images from each one of the at least three cameras to generate a left eye view and a right eye view of the substantially 360 degree field of view.

In some embodiments, each one of the at least three cameras is adapted to capture images are dynamic images.

In some embodiments, the portions of the captured images from each one of the at least three cameras selected for stitching each corresponds to a field of view of 360 degrees°/N, where N is a number of the at least three cameras.

In some embodiments, the processing device is for defining a first border and a second border for each portion of the images captured by a given one of the at least three cameras selected for stitching, the first border corresponding at least in part to a first line joining a center point of the given camera and a center point of a first one of the at least three cameras neighboring the given camera and the second border corresponding at least in part to a second line joining the center point of the given camera and a center point of a second one of the at least three cameras neighboring the given camera.

In some embodiments, for each portion of a captured image selected for stitching, the processing device is for defining the first border to correspond to the first line and the second border to correspond to the second line until a perimeter of the image is reached.

In some embodiments, the processing device is for receiving the captured images comprising receiving from the given camera an image comprising a first reproduction of the first neighboring camera and a second reproduction of the second neighboring camera, a first portion of the image and a second portion of the image selected for stitching.

In some embodiments, the processing device is for defining for each one of the first and second portions of the image the first and second borders each comprising a first section and a second section, for the first portion of the image, the first section of the first border corresponding to the first line, the first section of the second border corresponding to the second line, the second section of the first border extending away from the first line for removing the first reproduction from the first portion of the image, and the second section of the second border extending away from the second line and having a same shape as the second section of the first border, and for the second portion of the image, the first section of the first border corresponding to the second line, the first section of the second border corresponding to the first line, the second section of the first border extending away from the second line for removing the second reproduction from the second portion of the image, and the second section of the second border extending away from the first line and having a same shape as the second section of the first border.

In some embodiments, the first border of the first portion of the image is defined to correspond to the first line until the first reproduction is reached and the first border of the second portion of the image is defined to correspond to the second line until the second reproduction is reached, the first border and the second border of any one of the first and the second portion of the image having a same length.

In some embodiments, the processing device generates the left eye view and the right eye view by stitching together the portions of the captured images from each one of the at least three cameras selected for stitching along the left and right borders.

In some embodiments, the processing device generates the left eye view by stitching together a first plurality of the portions of the captured images and the right eye view by stitching together a second plurality of the portions of the captured images, the second plurality of the portions of the captured images corresponding to a 180 degree rotation of the first plurality of the portions of the captured images.

In some embodiments, the processing device is for selecting as the first plurality of the portions of the captured images first ones of the portions of the captured images that comprise a first plurality of points each viewed from a first one of the at least three cameras positioned counter-clockwise from a first line of sight between a center of the circle and the one of the first plurality of points and for selecting as the second plurality of the portions of the captured images second ones of the portions of the captured images that comprise a second plurality of points each viewed from a second one of the at least three cameras positioned clockwise from a second line of sight between the center of the circle and the one of the second plurality of points.

In some embodiments, each one of the at least three cameras has a wide angle lens oriented one of in an upwards direction to capture the images from about the baseline height and above and in a downwards direction to capture the images from about the baseline height and below.

In some embodiments, each one of the at least three cameras has a single viewpoint fisheye lens.

In some embodiments, each one of the at least three cameras is adapted to capture the images at regular intervals, the at least three cameras synchronized together so that the images are captured at any given time simultaneously by the at least three cameras.

In some embodiments, the processing device is for formatting the left and right eye views for display in a spherical view.

In some embodiments, the processing device is for formatting the left and right eye views for display in a rectilinear view.

In some embodiments, the processing device is for formatting the left view and right eye views for display in a cylindrical view.

In some embodiments, the processing device is for encoding the left and right eye views as anaglyphs.

In some embodiments, the processing device is for formatting the left and right eye views for display on a head-mounted display.

In accordance with another broad aspect, there is provided a method for generating a substantially 360 degree view from images taken from a plurality of spaced apart cameras, the method comprising: capturing the images from a plurality of cameras fixed at a baseline height substantially equidistantly about a circle; and stitching together portions of the images from each one of the plurality of cameras along first and second borders corresponding at least in part to lines joining center points of neighboring ones of the plurality of cameras.

In some embodiments, the method further comprises generating a left eye view and a right eye view of the substantially 360 degree view and projecting the left eye view and right eye view together to create a depth perception.

In some embodiments, capturing the images comprises capturing dynamic images.

In some embodiments, capturing the images from the plurality of cameras comprises capturing the images from at least three cameras each having a wide angle lens oriented in a same direction and adapted to capture the images for a portion of the substantially 360 degree view.

In some embodiments, capturing the images comprises capturing the images from the plurality of cameras simultaneously at any given time.

In some embodiments, stitching together the portions of the images comprises stitching together the portions each corresponding to a field of view of 360 degrees/N, where N is a number of the plurality of cameras.

In some embodiments, capturing the images comprises capturing from any one of the plurality of cameras an image comprising a first reproduction of a first one of the plurality of cameras neighboring the camera and a second reproduction of a second one of the plurality of cameras neighboring the camera, a first portion of the image and a second portion of the image selected for stitching.

In some embodiments, the first and second borders of each one of the first and second portions of the image each comprise a first section and a second section, for the first portion of the image, the first section of the first border corresponding to a first line joining a center point of the camera and a center point of the first neighboring camera, the first section of the second border corresponding to a second line joining the center point of the camera and a center point of the second neighboring camera, the second section of the first border extending away from the first line for removing the first reproduction from the first portion of the image, and the second section of the second border extending away from the second line and having a same shape as the second section of the first border and for the second portion of the image, the first section of the first border corresponding to the second line, the first section of the second border corresponding to the first line, the second section of the first border extending away from the second line for removing the second reproduction from the second portion of the image, and the second section of the second border extending away from the first line and having a same shape as the second section of the first border.

In some embodiments, stitching comprises stitching along the first and the second borders, for each image, the first border of the first portion of the image defined to correspond to the first line until the first reproduction is reached and the first border of the second portion of the image defined to correspond to the second line until the second reproduction is reached, the first border and the second border of any one of the first and the second portion of the image having a same length.

In some embodiments, stitching comprises stitching along the first and the second borders, for each portion of a captured image selected for stitching, the first border defined to correspond to the first line and the second border defined to correspond to the second line until a perimeter of the image is reached.

In some embodiments, generating the left eye view comprises stitching together first portions of the images and generating the right eye view comprises stitching together second portions of the images, the second portions of the images corresponding to a 180 degree rotation of the first portions of the images.

In some embodiments, the method further comprises selecting as the first portions of the images first ones of the portions that comprise a first plurality of points with each one of the first plurality of points viewed from a first one of the plurality of cameras positioned counter-clockwise from a first line of sight between a center of the circle and the one of the first plurality of points and selecting as the second portions of the images second ones of the portions that comprise a second plurality of points with each one of the second plurality of points viewed from a second one of the at plurality of cameras positioned clockwise from a second line of sight between the center of the circle and the one of the second plurality of points.

In some embodiments, the method further comprises formatting the left and right eye views for display in a spherical view.

In some embodiments, the method further comprises formatting the left and right eye views for display in a rectilinear view.

In some embodiments, the method further comprises formatting the left view and right eye views for display in a cylindrical view.

In some embodiments, the formatting comprises encoding the left and right eye views as anaglyphs.

In some embodiments, the method further comprises formatting the left and right eye views for display on a head-mounted display.

In accordance with another broad aspect, there is provided a computer readable medium having stored thereon program code executable by a processor for generating a substantially 360 degree view from images taken from a plurality of spaced apart cameras, the program code executable for capturing the images from a plurality of cameras fixed at a baseline height substantially equidistantly about a circle; and stitching together portions of the images from each one of the plurality of cameras along first and second borders corresponding at least in part to lines joining center points of neighboring ones of the plurality of cameras.

In accordance with yet another broad aspect, there is provided a method for generating a substantially 360 degree view from images taken from a plurality of cameras. The method comprises capturing N input images from N cameras fixed at a baseline height substantially equidistantly about a circle in an omnipolar camera setup where N≥3, the cameras having ultra wide angle lenses oriented in a common direction, where every visible point surrounding the setup is capturable in stereo by at least two cameras; defining two epipolar lines per field of view from the cameras, the epipolar lines passing through a center point of each one of the cameras and a center point of two neighboring cameras and forming a total of N epipolar lines, to divide the field of view of each one of the cameras into four parts; stitching together image portions from each one of the cameras along vertical stitching planes passing through the epipolar lines to remove horizontal misalignments induced by parallax at stitching seams by, for each one of the cameras, selecting a first one of the four parts for a left eye view and a second one of the four parts for a right eye view; removing, from image portions, regions corresponding to a visible camera using deviations performed along the epipolar lines; forming a first output image for a left eye omnistereo view of substantially 360 degrees by stitching together the first one of the four parts from each one of the fields of view, the first output image composed of N image portions, one from each of the N input images; and forming a second output image for a right eye omnistereo view of substantially 360 degrees by stitching together the second one of the four parts from each one of the fields of view, the second output image composed of N image portions, one from each of the N input images, the second one of the four parts corresponding to a 180° rotation of the first one of the four parts.

BRIEF DESCRIPTION OF THE DRAWINGS

Further features and advantages of the present invention will become apparent from the following detailed description, taken in combination with the appended drawings, in which:

FIG. 1 is a schematic illustrating an exemplary embodiment for the omnipolar imaging device;

FIG. 2 is a block diagram of an exemplary computing device for processing images captured by the omnipolar imaging device;

FIGS. 3a-3d show how left/right omnistereo views are assembled following the baselines using three (3a, 3b) and four (3c, 3d) cameras;

FIG. 4a shows an input image for each camera in an omnipolar setup composed of three cameras;

FIG. 4b shows left and right output images corresponding to the input images of FIG. 4a;

FIG. 5a shows deviations in the shapes of the input images of FIG. 4a;

FIG. 5b shows left and right output images corresponding to the input images of FIG. 5a;

FIG. 7 illustrates an actual vertical field of view for each fisheye lens due to lens occlusion;

FIG. 8 is an exemplary graphical representation of vertical parallax with respect to angular elevation for points on a dome and on a vertical wall;

It will be noted that throughout the appended drawings, like features are identified by like reference numerals.

DETAILED DESCRIPTION

Figure 6A:
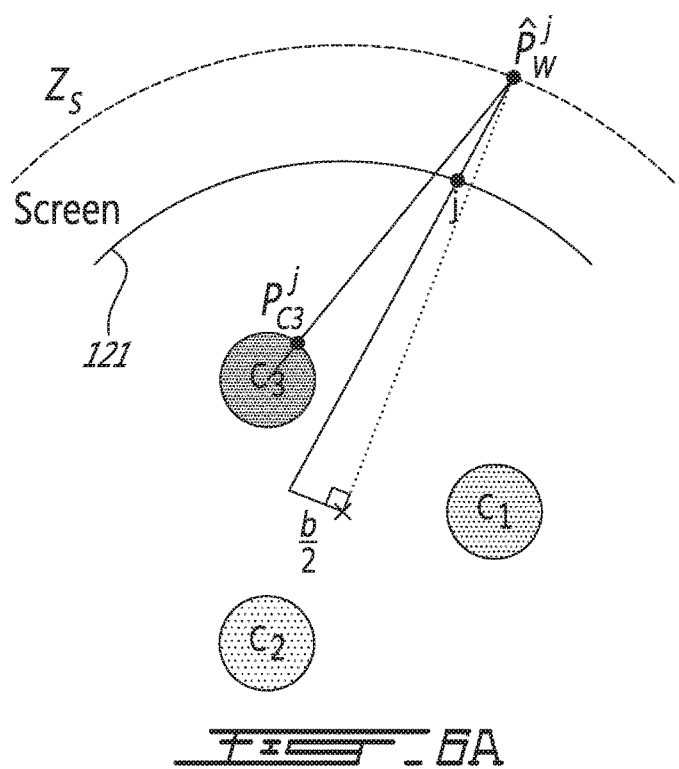
FIG. 6a-6b illustrate the process for rendering of an omnistereo image for a dome display or cylindrical screen (6a) and distortions that may occur in the rendered position on the screen.

FIG. 1 illustrates an exemplary setup for an omnipolar imaging device 10. Three ultra wide angle lenses 1, such as fisheye lenses, are mounted onto three cameras 2. The cameras may be of any type on which an ultra wide angle lens can be provided in order to capture static and/or video (i.e. dynamic) images. For example, the cameras may be Prosilica 1380 cameras of 1360×1024 pixel resolution with Fujinon C-mount fisheye lenses, or Canon HFS11 cameras of 1920×1090 pixel resolution with Opteka Vortex fisheye lenses. The cameras 2 are securely fixed onto a cylindrical attachment 4 resting on a support 3. The cylindrical attachment 4 and support 3 may take various forms to ensure a known and fixed relative position of each camera 2. A single means, such as a three-camera tripod, may be used. The omnipolar imaging device 10 may face upwards, as illustrated, and capture images from the height of the lenses 1 and above, or it may be positioned with the lenses 1 facing downwards in order to capture images from about the height of the lenses 1 and below. Although the cameras 2 are shown as being placed vertically (i.e. extending along the direction of axis z), it should be understood that the omnipolar imaging device 10 may be positioned such that the cameras 2 are placed horizontally (i.e. extend along the direction of axis x). Other configurations may apply. Also, more than three cameras may be used, as will be explained in more detail below.

The images captured by the cameras 2 are transmitted to a computing device 6 via connection means 5. Once received at the computing device 6, the captured images are illustratively processed (in the manner discussed further below) to generate output images for rendering on a display (not shown). Processing of the images acquired by the omnipolar imaging device 10 may comprise estimating scene depth. Image stitching may also be performed using the computing device 6, as will be discussed herein below. In one embodiment, processing of the captured images may be performed at the computing device 6 in response to one or more input commands being received (e.g. from a user) via a suitable input means (e.g. mouse, keyboard, or the like) provided with the computing device 6. Transmission can occur in real time, i.e. at the time of capture, or at a later time after having saved the captured images on a memory device (not shown). The connection means 5 may be wired, as illustrated, or wireless. Each camera may have an internal clock allowing image acquisition at regular intervals, such as 24, 30, 60 images/second, etc). The internal clocks of all cameras may be synchronized together to allow simultaneous image capture by all cameras at any given time. Synchronization may be done in various ways, depending on the type of camera used. For example, when using Prosilica 1380 cameras, synchronization may occur via a network connection that links the cameras to a computing device (for example computing device 6). When using Canon HFS11 cameras, a wired remote for stereo video and digital stereo photography, such as the LANC Shepherd™, may be used. Other ways of synchronizing the cameras together will be readily understood by those skilled in the art.

The computing device 6 may correspond to one or more server(s) provided remotely and accessible via any type of network, such as the Internet, the Public Switch Telephone Network (PSTN), a cellular network, or others known to those skilled in the art. Any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

As illustrated in FIG. 2, the computing device 6 comprises, amongst other things, a plurality of applications $24a \ldots 24n$ running on a processor 22, the processor being coupled to a memory 20. It should be understood that while the applications $24a \ldots 24n$ presented herein are illustrated and described as separate entities, they may be combined or separated in a variety of ways.

The memory 20 accessible by the processor 22 receives and stores data. The memory 20 may be a main memory, such as a high speed Random Access Memory (RAM), or an auxiliary storage unit, such as a hard disk, flash memory, or a magnetic tape drive. The memory may be any other type of memory, such as a Read-Only Memory (ROM), Erasable Programmable Read-Only Memory (EPROM), or optical storage media such as a videodisc and a compact disc.

The processor 22 may access the memory 20 to retrieve data. The processor 22 may be any device that can perform operations on data. Examples are a central processing unit (CPU), a front-end processor, a microprocessor, a graphics processing unit (GPU/VPU), a physics processing unit (PPU), a digital signal processor, and a network processor. The applications $24a \ldots 24n$ are coupled to the processor 22 and configured to perform various tasks, such as processing input images received from the cameras 2 to generate output images, as explained below in more detail. An output may be transmitted to any type of device, e.g. a display.

The cameras 2 are spaced equally around a circle. A projection model, which defines how points in the world are mapped to camera pixels, is determined by assuming that the cameras 2 use single viewpoint lenses 1, that all cameras 2 look in the same direction. Let $(o_x, o_y)$ be the principal point (image center of a camera 2). Each pixel $p=(x, y)$ is mapped onto a unit sphere using the angle $\phi$ around the image center and the angle $\theta$ related to the lens field of view:

$$\varphi = \arctan(y - O_y, X - O_x) \tag{1}$$

$$\theta_d = \frac{\|(x - o_x, y - o_y)\|}{f} \tag{2}$$

The angle $\theta_d$ represents a distorted value of the angle $\theta$ in an equidistant projection model for which pixels are directly proportional to angles. Angle $\theta$ is modeled as a function of $\theta_d$ and distortion coefficients $k_1$, $k_2$ are modeled in a polynomial function:

$$\theta = \theta_d(1 + \theta_d^2 k_1 + \theta_d^4 k_2) \tag{3}$$

Thus, pixel values can be mapped to rays in camera space as:

$$p_c = \Omega_y(\phi)\Omega_z(\pi - \theta)(1, 0, 0, 1)^T \tag{4}$$

where $\Omega_y$ and $\Omega_z$ are rotation matrices with respect to the y-axis and the z-axis respectively. Furthermore, the camera positions are modeled to lie on a unit circle in the x-z plane and each camera's up vector to be normal to this circle. A unit ray in camera space is thus mapped to a world point using the following relation:

$$p_w = R_y T_z R_{xz} Z p_c \tag{5}$$

where $R_y$ is a rotation matrix with respect to the y-axis that defines the position on the circle, $T_z$ is a unit translation along the z-axis, and $R_{xz}$ is a combination of two rotations with respect to the x and z-axis respectively. The Z parameter is the depth seen at pixel (x, y) which is unknown a priori.

To calibrate the N=3 cameras, the center $(o_{xi}, o_{yi})$ of the image circle of camera i, for $i \in 1, 2, \ldots, N$ is first manually located. Several parameters still need to be calibrated, namely the internal parameters f, $k_1$ and $k_2$ which are fixed to be the same for all lenses, and rotation angles $r_{xi}$, $r_{yi}$ and $r_{zi}$, except $r_{y1}$ which is forced to 0. These parameters are estimated in a bundle minimization using an over-constrained system of about M=20 features $p_i^j=(x_i^j, y_i^j)$ for $j \in 1, 2, \ldots, M$. These features are manually located in all cameras. The f parameter is initialized as the ratio of the image circle radius in pixels over $\pi$, and rotation angles $r_{y2}$, $r_{y3}$ are initialized to $(2\pi(i-1))/N$. Other parameters are initialized to 0. To increase stability of the f estimation, one epipole $e_i^k$ is located in each image and the distance of their projection in the world to the x-z plane is minimized. Thus, the following sum is minimized using the Levenberg-Marquardt method:

$$\sum_{j=1}^{M} \sum_{i=1}^{N} \|fi(p_w^j) - (x_i^j, y_i^j)\| + \sum_{i=1, k \neq i}^{N} \|g(e_i^k)[y]\| \quad (6)$$

where $f_i(\ )$ is a function which maps a point in the world to a pixel position in image i, and $g(\ )$ is a function which takes a pixel and maps it to the world at $Z=1$. See equations 4 and 5. At each iteration of the bundle adjustment, the location of the features in the world $p_w^j$ are estimated in Euclidean space by triangulation using the updated camera parameters:

$$p_w^j = \left(\sum_i I - p_{c_1}^j p_{c_1}^{jT}\right)^{-1} \left(\sum_i I - p_{c_1}^j p_{c_1}^{jT}\right) c_i \quad (7)$$

where I is a 3×3 identity matrix, $p_{ci}^j$ is the point $p_i^j$ mapped to camera i, and $c_i$ is the position of camera i.

FIGS. 3a to 3d show how left and right omnistereo views may be assembled following the baselines, for the omnipolar imaging device 10. FIG. 3a represents the left eye view of a three camera system and FIG. 3b represents the right eye view of the three camera system. FIG. 3c represents the left eye view of a four camera system and FIG. 3d represents a right eye view of the four camera system.

Referring to FIG. 3a, stitching of the images to obtain the 360 degree view is performed using three distinct field of view regions from cameras C1, C2, and C3 respectively. Region 34 corresponds to a 120 degree view from camera C1, region 30 corresponds to a 120 degree view from camera C2, and region 32 corresponds to a 120 degree view from camera C3. The views are delimited along three lines 36, 38, 40. Line 36 intersects the center point of each one of cameras C1 and C2, line 38 intersects the center point of each one of cameras C1 and C3, and line 40 intersects the center point of each one of cameras C2 and C3. These lines 36, 38, 40 thus pass through the epipolar points of each one of cameras C1, C2, and C3 and are chosen as the stitching locations for three views of 120 degree each as they represent the point of minimum parallax for each pair of camera.

As used herein the term "epipoles" or "epipolar points" refers to the intersections between the captured images and the baseline joining two camera positions. Regardless of the number of cameras used, two lines passing through each camera and its two neighboring cameras on the circle are defined. Thus, the two lines passing through a camera divide its 360 degree field of view into four parts. When using three cameras, two parts have a 120 degree field of view and two parts have a 60 degree field of view. Only the 120 degree parts are illustratively used, one to produce the left view and the other to produce the right view. Formally, the parts that are used are defined by Equation (9) below.

In FIG. 3b, the field of view used for each camera corresponds to a 180 degree rotation of the field of view used in FIG. 3a. Region 31 corresponds to a 120 degree view from camera C11, region 33 corresponds to a 120 degree view from camera C2, and region 35 corresponds to a 120 degree° view from camera C3. The views are still delimited along three lines 36, 38, 40, but the field of view of each one of cameras C1, C2 and C3 selected for stitching to create the 360 degrees view differ from those for the left eye as illustrated in FIG. 3a.

Once images have been captured by the cameras (e.g. C1, C2, C3) or once the two images have been assembled from the parts as in FIGS. 3a and 3b, it is possible to decide which one is for the left eye or right eye as follows. Any point on the scene observed from point X (representative of the position of an ideal observer at the center of the screen) is viewed by two possible cameras. If the camera by which the scene is viewed is located counter-clockwise from the line of sight (X to the scene point), then the image for the left eye. If the camera is located clockwise, then this image is for the right eye. The FIGS. 3a and 3b are therefore for the left eye and right eye, respectively.

Referring to FIG. 3c, stitching of the images to obtain the 360° view is performed using four distinct field of view regions from cameras C1, C2, C3, and C4 respectively. Region 42 corresponds to a 90 degree view from camera C1, region 44 corresponds to a 90 degree view from camera C2, region 46 corresponds to a 90 degree view from camera C3, and region 48 corresponds to a 90 degree view from camera C4. The views are delimited along four lines 50, 52, 54, 56. Line 50 intersects the center point of each one of cameras C1 and C2, line 52 intersects the center point of each one of cameras C2 and C3, line 54 intersects the center point of each one of cameras C1 and C3, and line 56 intersects the center point of each one of cameras each one of C3 and C4. These lines 50, 52, 54, 56 thus pass through the epipolar points of each one of cameras C1, C2, C3 and C4 and are chosen as the stitching locations for four views of 90 degree each as they represent the point of minimum parallax for each pair of camera.

In FIG. 3d, the field of view used for each camera corresponds to a 180 degree rotation of the field of view used in FIG. 3c. Region 43 corresponds to a 90 degree view from camera C1, region 45 corresponds to a 90 degree view from camera C2, region 47 corresponds to a 90 degree view from camera C3, and region 49 corresponds to a 90 degree view from camera C4. The views are still delimited along four lines 50, 52, 54, 56, but the field of view of each one of cameras C1, C2, C3 and C4 selected for stitching to create the 360 degree view differ from those for the left eye as illustrated in FIG. 3d. Although stitching patterns are illustrated for three-camera and four-camera setups, it should be understood that the concept can be extended to more than four cameras, while following the same principles.

FIG. 4a illustrates input images 102a, 102b, and 102c captured by each one of three cameras (e.g. cameras C1, C2, and C3 of FIG. 3a) in the omnipolar setup of FIG. 3a and FIG. 3b. For each input image 102a, 102b, or 102c, the image regions 104a, 104b, 104c and 106a, 106b, 106c are selected for stitching and used to produce an omnistereo pair of images, with each region 104a, 104b, 104c, 106a, 106b, 106c spanning about 120 degrees. As discussed above with reference to FIG. 3a and FIG. 3b, the regions 104a, 104b, 104c are used to produce the image for the left eye and the regions 106a, 106b, 106c are used to produce the image for the right eye. However, since the cameras C1, C2, C3 have a wide vertical field of view, for each image as in 102a, 102b, 102c captured by a given camera C1, C2, or C3, the two remaining cameras (and particularly the lenses thereof) may be visible in the captured image. If no camera is visible in the captured image, each image region may have a border that corresponds to (e.g. follows) the line joining the center point of the camera having captured the image and the center point of a neighboring camera. In particular, the border may correspond to the line and extend from the center point of the camera having captured the image until the image's perimeter (not shown) is reached.

Otherwise, in order to ensure that the final omnistereo pair of images do not contain the image of the visible cameras, each region 104a, 104b, 104c, 106a, 106b, 106c captured by a given camera C1, C2, or C3 may be stopped in length before reaching the two remaining visible cameras. For instance, for input image 102a captured by camera C1, the region 104a is extended from a center 106 of the captured image 102a towards a border (not shown) of the captured image 102a but is stopped before reaching the reproduction 108 of camera C2 that has been captured by camera C1. Similarly, region 106a is stopped before reaching the reproduction 110 of camera C3 that has been captured by camera C1. Thus, regions 104a and 106a extend away from the center 106 without reaching the perimeter of the captured image 102a. In this manner, self-occlusion, i.e. one camera occluding another one, is avoided. FIG. 4b illustrates the left output image 109a and right output image 109b, which correspond to the input images shown in FIG. 4a. In particular, left output image 109a comprises image regions 104a, 104b, 104c stitched together while right output image 109b comprises image regions 106a, 106b, 106c stitched together.

Stopping the image regions in length before any visible camera in the captured image is reached (i.e. before reaching the image's perimeter) reduces the output field of view (e.g. the overall area of the left and right output images 108a, 108b). Indeed, the portion of the field of view of input images 102a, 102b, 102c, in which visible cameras can be seen, is removed from the resulting left and right output images 109a, 109b. In order to increase the output field of view, the regions 104a, 104b, 104c, 106a, 106b, and 106c of each input image 102a, 102b, or 102c may alternatively be adjusted to obtain new regions 112a, 112b, 112c and 114a, 114b, 114c, as illustrated in FIG. 5a. In particular, in this embodiment, the borders of the regions are delimited only in part by the lines, which intersect the center points of neighboring camera pairs. Indeed, in this embodiment, the image regions are made to slightly deviate away from the lines starting from a point where a camera is visible. Therefore, the borders (not shown) of the image regions no longer strictly follow the above-mentioned lines but only follow part thereof until a reproduction as in 108 or 110 of a camera is visible in the input image as in 102a. Each border may thus comprise a first section (not shown) that corresponds to (e.g. follows) a line (until a reproduction of a camera is reached) and a second section that deviates away from the line (until the image's perimeter is reached) so as to remove from the image region a shape corresponding to the reproduction 108, 110 of the visible camera. As the deviation illustratively depends on the camera setup, the deviation process may be defined once in a pre-processing step.

It should be understood that the deviations are performed so as to pass around visible cameras and the shape of the deviations may accordingly depend on the shape of the visible cameras to be removed. In particular, the shape of the deviation may follow the shape of the visible camera. Alternatively, the deviation may be performed so that the borders of the image region deviate from the above-mentioned lines by predetermined angles and/or heights. For instance, a first or left border (not shown) of region 112a deviates from the line 116 (joining the center point of camera C1 having captured image 102a to the center point of camera C2) so that region 112a does not include the reproduction 108 of camera C2, the shape of the reproduction 108 being removed from region 112a. The first or left border (not shown) of region 114a similarly deviates from the line 118 (joining the center point of camera C1 to the center point of camera C3) so that region 114a does not include the reproduction 110 of camera C3, the shape of the reproduction 110 being removed from region 114a. A given angle (e.g. 20 degrees, not shown) may then be formed between the line 116 and a line 117 joining the center point of camera C1 and a point (not shown) at which the deviated first border of image region 112a reaches the perimeter of image 102a. Still, it should be understood that it is desirable to minimize the amount (e.g. angle) of deviation from a given line 116, 118.

In order to compensate for removal of a reproduction of a visible camera, i.e. for deviation from the lines (e.g. lines 116, 118) at a given (e.g. left) border of a region, deviation is also performed at the other (e.g. right) border of the region to add to the region in question an image portion corresponding to the shape of the visible camera removed from the image portion. In particular, the second or right border (not shown) of region 112a is made to deviate from the line 118 while the second or right border (not shown) of region 114a is made to deviate from the line 116. It should be understood that, for any given image region as in 112a or 114a, the shape (e.g. curvature or other geometry) of the deviation performed at the first border is the same as the shape of the deviation performed at the second border, with both the first and second borders illustratively having the same length. Also, both the first and the second border of image region 112a illustratively deviate from their corresponding line 116, 118 by a same angle (e.g. 20 degrees). The resulting left and right output images 120a, 120b are illustrated in FIG. 5b, where left output image 120a comprises image regions 112a, 112b, 112c stitched together while right output image 120b comprises image regions 114a, 114b, 114c stitched together.

Rendering of an omnistereo image for a dome or planetarium display (spherical view) or cylindrical screen (cylindrical view) centered at a point 'x' using the three camera setup of FIGS. 3a and 3b and angles $\alpha_1$, $\alpha_2$, $\alpha_3$ between two consecutive baselines is as follows. The external matrices (rotation and translation matrices) of this output image are set to be identity matrices. The output distortion coefficients $k_1$ and $k_2$ are also set to 0.

The image for the left eye in an omnistereo dome is first considered. Assuming a fixed scene depth of $Z_s$, each pixel j is projected to a sphere of radius $Z_s$ to get an estimated world point position $\hat{p}^j_w$, as illustrated in FIG. 6a. This projection depends on $Z_s$, the screen radius, and the eye separation b, which is fixed to the average human eye separation, i.e. 6.5 cm.

Considering $w^j_i$, the horizontal angular position of point $\hat{p}^j_w$ in camera i (or $c_i$), given by:

$$w^j_i = \arctan(\hat{p}^j_w[z] - c_i[z], \hat{p}^j_w[x] - c_i[x]) \quad (8)$$

The pixel sample of point $\hat{p}^j_w$ reprojected in camera i is used only if $w^j_i$ is within $[\gamma_{i-1}, \gamma_i]$ where $\gamma_i$ are angles defined as:

$$\gamma_i = \gamma_{i-1} + \pi - \alpha_i \quad (9)$$

with $\gamma_0 = 0$ corresponding to the direction of the line joining cameras $c_1$ and $c_N$.

To render the image for the right eye, the same intervals can be used but an offset of $\pi$ is added to the $w^j_i$ values. Thus, an omnistereo pair of images is produced covering the full 360 degree field of view horizontally.

The vertical field of view free of self-occlusion is nearly 180 degrees. The amount of occlusion depends on the baseline and lens curvature, as illustrated in FIG. 7. For highly curved lenses, the baseline can be slightly increased to get a wider vertical field of view without self-occlusions. It should be noted that for an odd number of cameras, these occlusions create non-adjacent monocular regions as they are not located in the same image regions in the left and right omnistereo images.

Each image in the omnistereo pair has a number of monocular seams that corresponds to the number of cameras. By using vertical stitching planes (in the three-dimensional geometry space of the camera setup) passing by the epipoles, there are no horizontal misalignments at the seams induced by parallax, regardless of the scene depths. However, there are vertical misalignments for points outside the x-z plane. The magnitude of these vertical misalignments at the seams depends on the range of depths and the angular elevation with respect to the x-z plane.

One can choose a single depth for which no vertical parallax is produced, namely points at depth $Z_s$. It is therefore important to choose $Z_s$ carefully. For instance, one could set $Z_s$ to be the distance of the ceiling above the cameras, as this is where vertical parallax is worse.

Vertical parallax is quantified by considering $Z_s=\infty$ at different angular elevations $\beta$. In particular, two sets of scene points, namely points on a dome, are considered:

$$p_w^{dome}(\beta)=c_1+Ry(30°)R_x(\beta)(-Z_r, 0, 0)^T$$

and points on a wall:

$$p_w^{wall}(\beta)=c_1+Ry(30°)(-Z_r, \tan(\beta)Z_r, 0)^T$$

where 30° corresponds to the orientation of the seam between cameras $c_1$ and $c_2$, and $Z_r$ is the radius of the dome or the wall distance. Both the radius of the dome and the wall distance were fixed to be 2.3 m as this value substantially corresponds to the radius of the cylindrical screen and that no scene point should ideally be closer to avoid window violations. Vertical parallax was then computed by taking the difference between projections with respect to cameras $c_1$ and $c_2$ on a dome having a 2048×2048 pixel resolution:

$$\text{Parallax}(p_w^{dome,wall})=\|f_1(p_w^{dome,wall})-f_2(p_w^{dome,wall})\|.$$

Vertical parallax in pixels is shown in FIG. 8. It is 0 for points in the x-z plane and increases to about 20 pixels at the top of the dome (curve 52), and to about 9 pixels for points on a vertical wall at a 45 degrees elevation (curve 54). Thus, although vertical parallax is an issue, this experiment shows that it is typically small and varies with the kind of scene observed.

Perceptual stereo distortions may be computed at the center of the visual system for points in the x-z plane. For any scene point $p_w^j$, it is assumed that an observer located at the center of a dome display or cylindrical screen is looking straight at it. One can then measure where this point is perceived as follows. The location of the eyes is given by $R_y(\alpha)(\pm b/2, 0, 0)^T$, where $\alpha$ is the orientation of the eye baseline given by $\alpha=\arctan(p_w^j[x], p_w^j[z])$. Again, the value used for b is 6.5 cm as this is the average human eye separation. Rendering positions of several scene points $p_w^j$ are then computed for two $Z_s$ values, namely $\infty$ and 4 m, and rays joining the eyes and the rendering positions triangulated. The left/right rendering positions on the screen can be computed by considering $\hat{p}_w^j$ at depth $Z_s$ instead of its true position at $p_w^j$ (see FIG. 6a and FIG. 6b). The left/right rendering positions on the screen can be computed by intersecting the lines joining i and the corresponding left/right camera positions with a circle of radius $Z_s$, and then normalizing these intersections to screen radius.

Figure 6B:
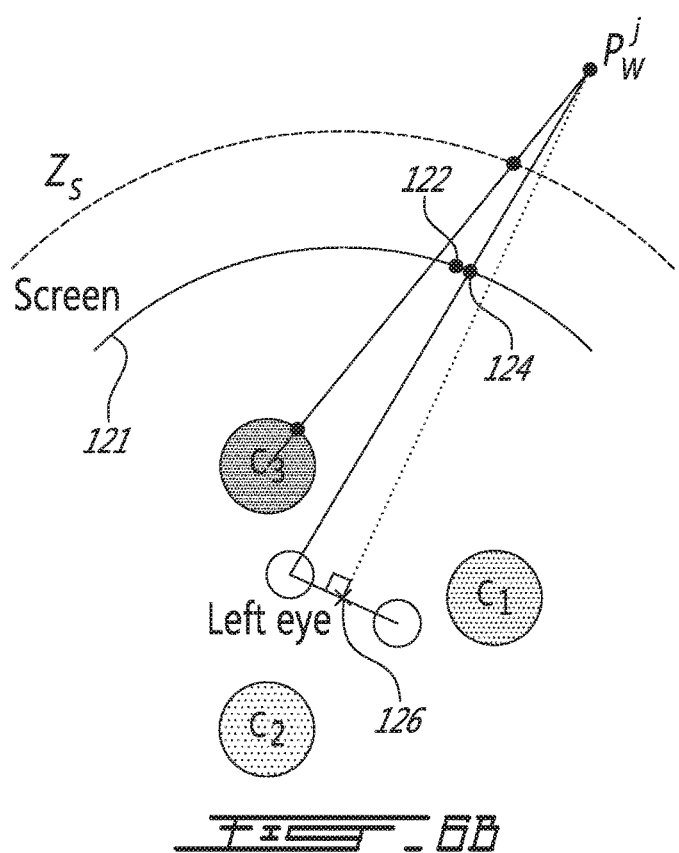

In particular and as illustrated in FIG. 6a, when rendering on a screen 121 the left image of the omnistereo pair, pixel j is projected at depth $Z_s$ to get $\hat{p}_w^j$ which is seen by the selected camera C3 at pixel $p_{c_3}^j$. Thus, the image color at $p_{c_3}^j$ is copied on the screen at pixel j. As can be seen in FIG. 6b, when a world point $p_w^j$ is not located at depth $Z_s$, distortions occur because the rendered position 122 on the screen 121 does not correspond to the position 124 it should be seen at when an observer positioned at the center 126 of the screen 121 is looking straight at the screen 121.

Figure 9B:
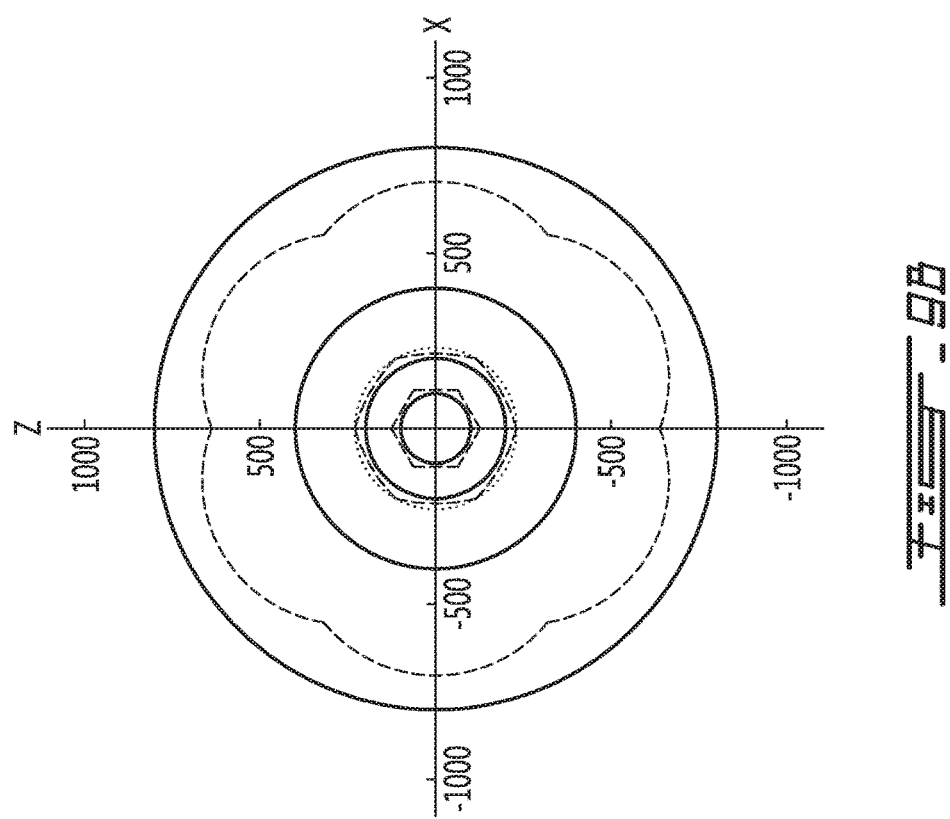
FIGS. 9a-9f illustrate perceptual depth distortion points in the x-z plane at eye level using three (9a, 9b), four (9c, 9d), and five (9e, 9f) cameras.
Figure 9A:
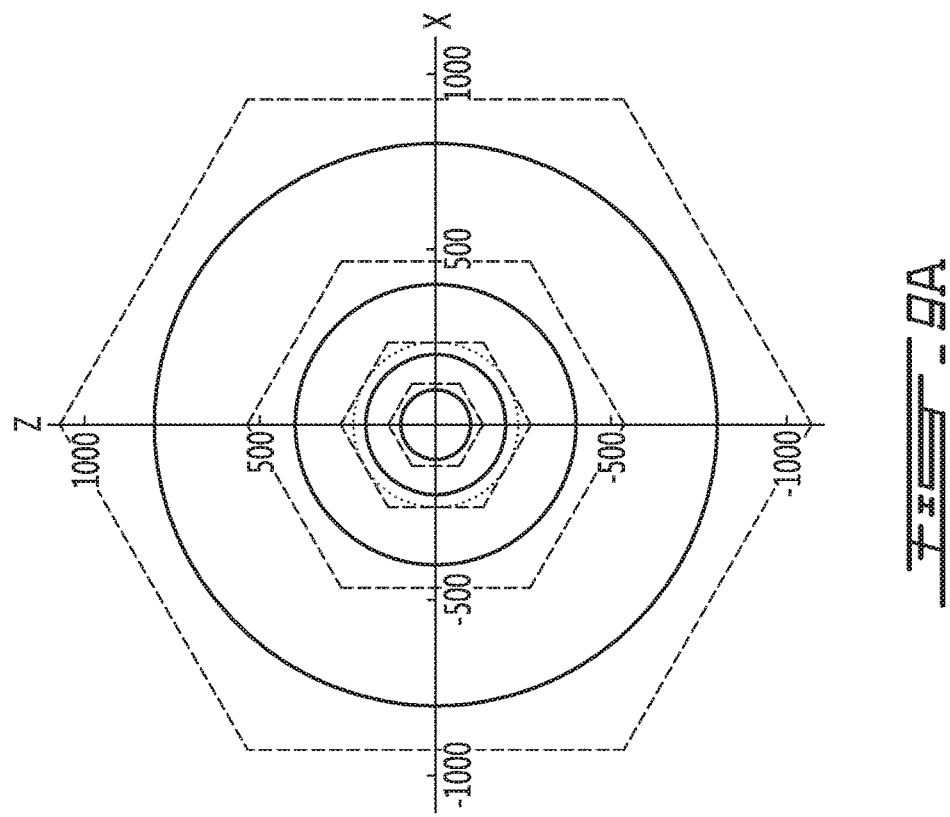
Figure 9D:
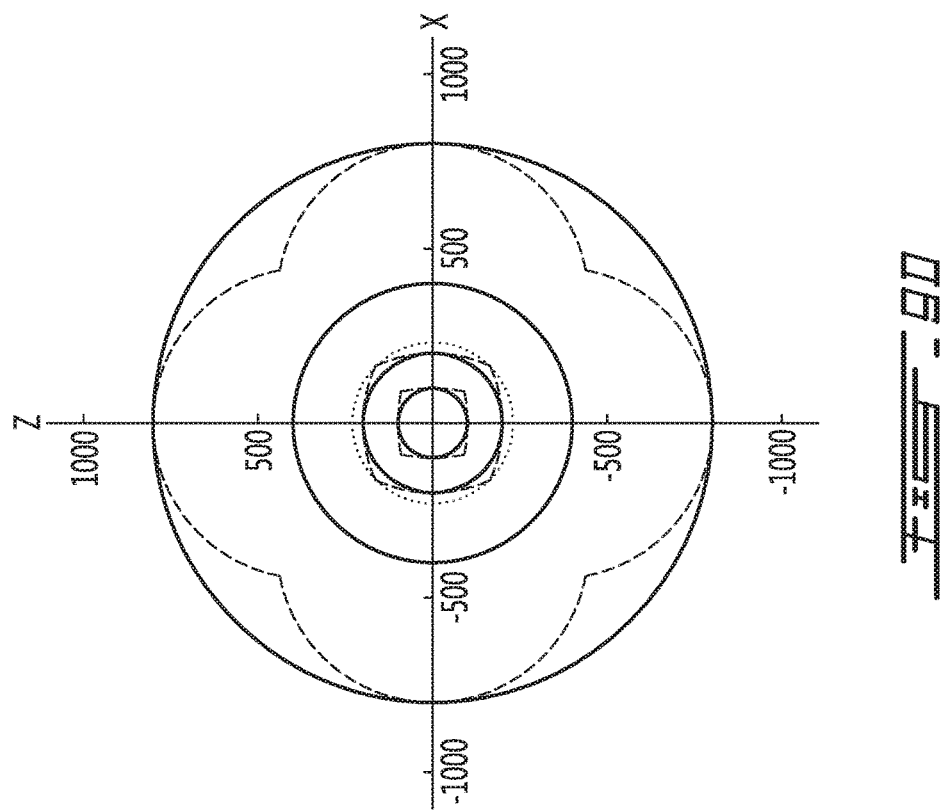
Figure 9C:
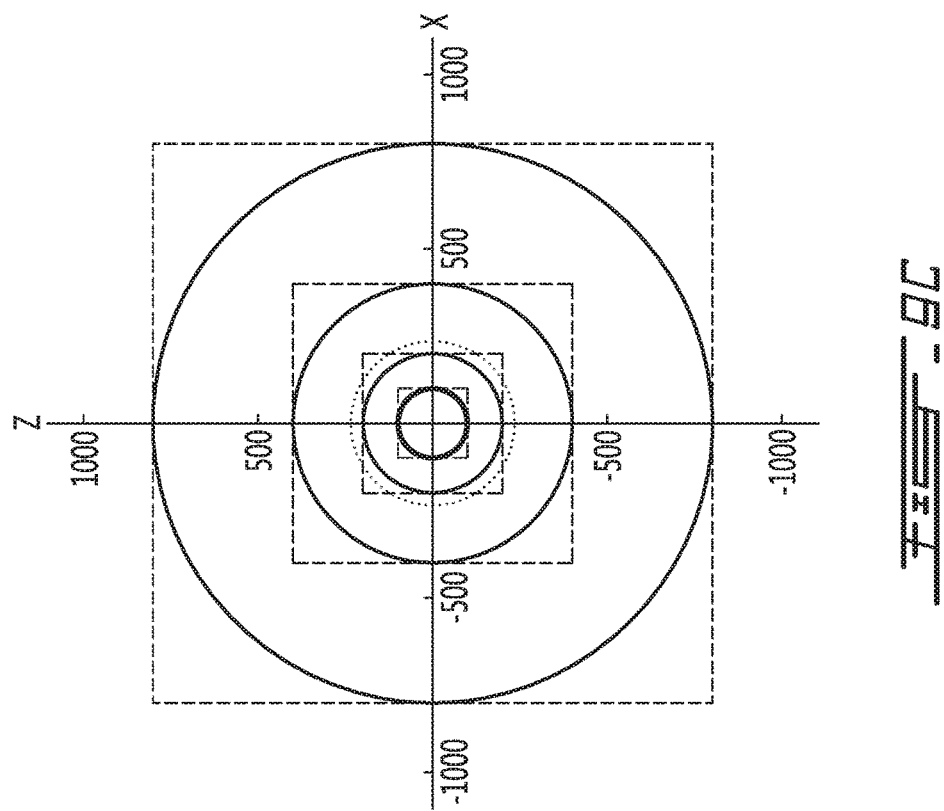
Figure 9F:
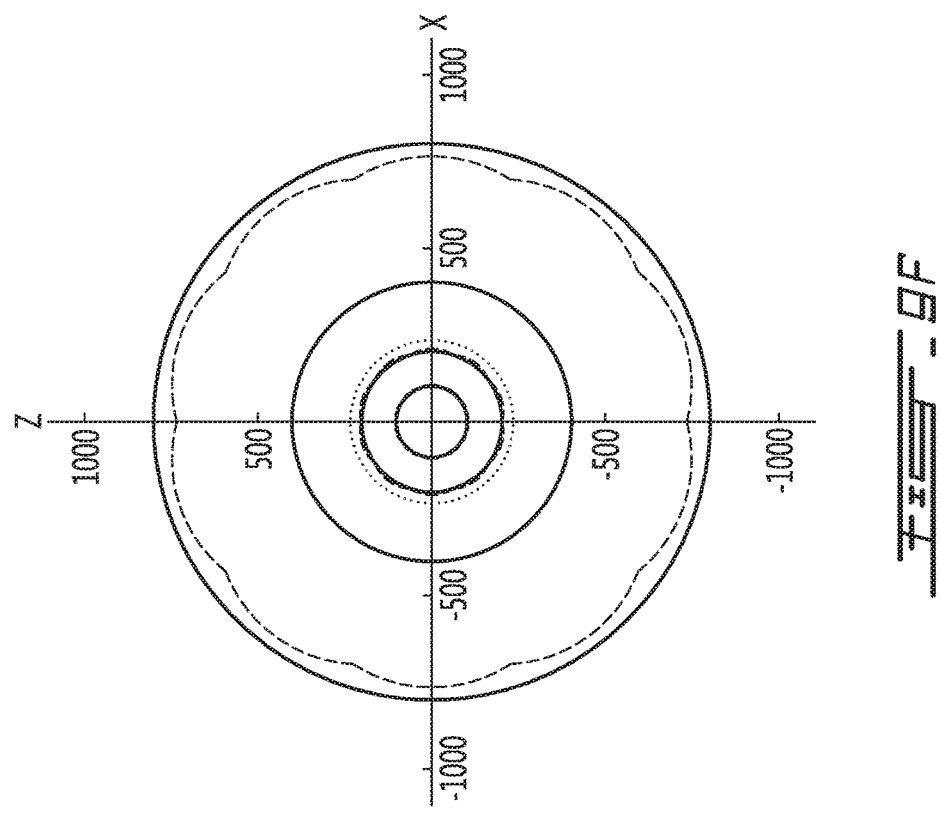
Figure 9G:
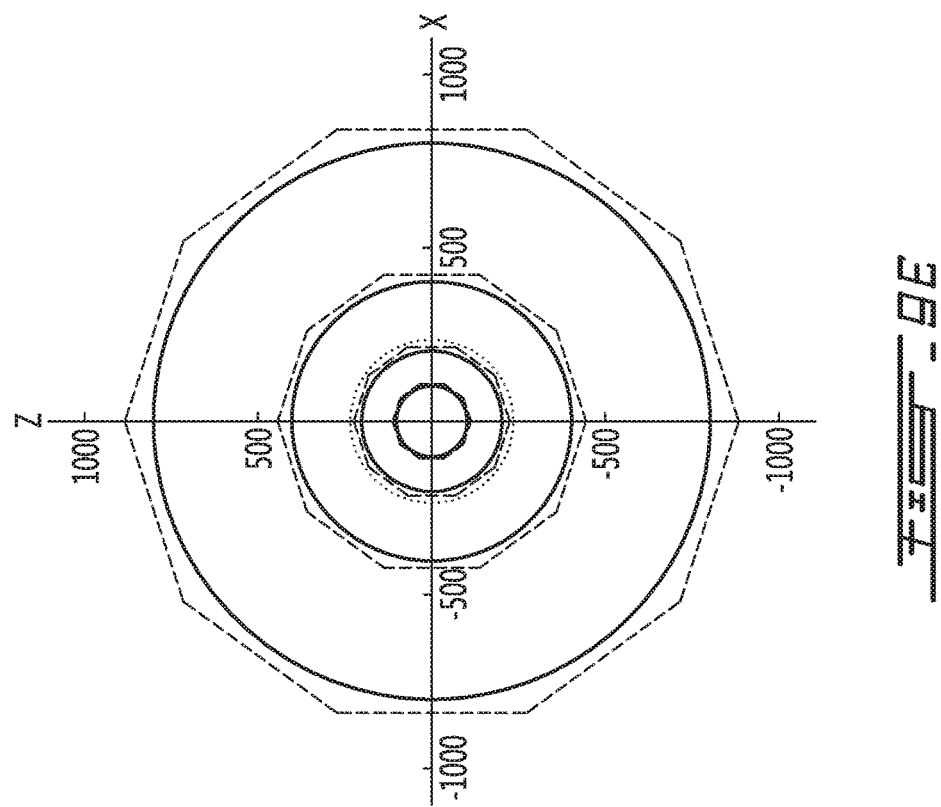

FIGS. 9a-9f show how points are distorted at different depths (with the true position of the points shown in solid lines, the distorted position in dash lines, and the screen radius in dotted lines, namely 100 cm, 200 cm, 400 cm and 800 cm. FIGS. 9a, 9c and 9e show distortions for $Z_s=\infty$ when using three (3), four (4) and five (5) cameras, respectively. FIGS. 9b, 9d and 9f show distortions for $Z_s=400$ cm when using three (3), four (4) and five (5) cameras, respectively. It is noted that using an odd number of cameras distorts a circle of points into 2N straight lines or arcs, while using an even number of cameras leads to a distortion into N straight lines or arcs.

This can be explained by looking at FIGS. 3a-3d. Say that an observer located at the center of the screen is looking in the direction of camera C4. The stereo view is captured by cameras C1 and C3 as they correspond exactly to the positions of the eyes. In fact, the camera pairs (C1, C3) and (C2,C4) each provide two (2) stereos views for a total of four (4) stereo views. There is no stereo distortion at the center of these stereo views. When using an odd number of cameras, there is never a pair of cameras that correspond exactly to the eye positions. There is no distortion whereas points behind $Z_s$ appear slightly closer in depth, and points in front of $Z_s$ appear further away in depth. However, the number of straight lines or arcs is increased for a better circle approximation. Overall stereo distortions are reduced considerably when using five (5) cameras.

Furthermore, there is perceptual singularity for scene points on the y-axis because the observer can look directly upwards with an arbitrary eye orientation. For domes, it is assumed that an observer can look all around him, but can tilt his head up to at most 90 degrees. There should therefore be only one scene depth for a dome at its zenith and the scene depth has to be at screen distance (i.e. with zero disparity). Although reference is made herein to domes (i.e. to display of left and right images as a spherical view), it should be understood that captured images may be formatted for display in a rectilinear view, e.g. on a monitor display, in a cylindrical view, e.g. on a cylindrical screen or as a video-projection, on a head-mounted display, e.g. in an OculusRift view, or other suitable format known to those skilled in the art. Thus, a variety of screens (as in 121 in FIG. 6a) or displays may apply. The stereo images may be encoded as anaglyphs, such as red/cyan anaglyphs, or the like, (e.g. when using a dome or monitor display) or left/right images may be positioned side by side (e.g. when using a head-mounted display). Users may choose the direction of their gaze by rotating their head or by software control.

The stitching method described above using epipoles of neighboring cameras could also be used in the context of monocular camera systems to reduce seam misalignments due to parallax. For instance, a camera system such as the Ladybug™, a spherical imaging system, typically uses a few cameras to cover a full 360 degree view with high resolution. Unfortunately, not all cameras can be located exactly at the same position. Thus, there is parallax from one image to its neighboring image. This creates misalignments at the seams. These misalignments can be observed in systems such as Google Street View™.

Figure 10:
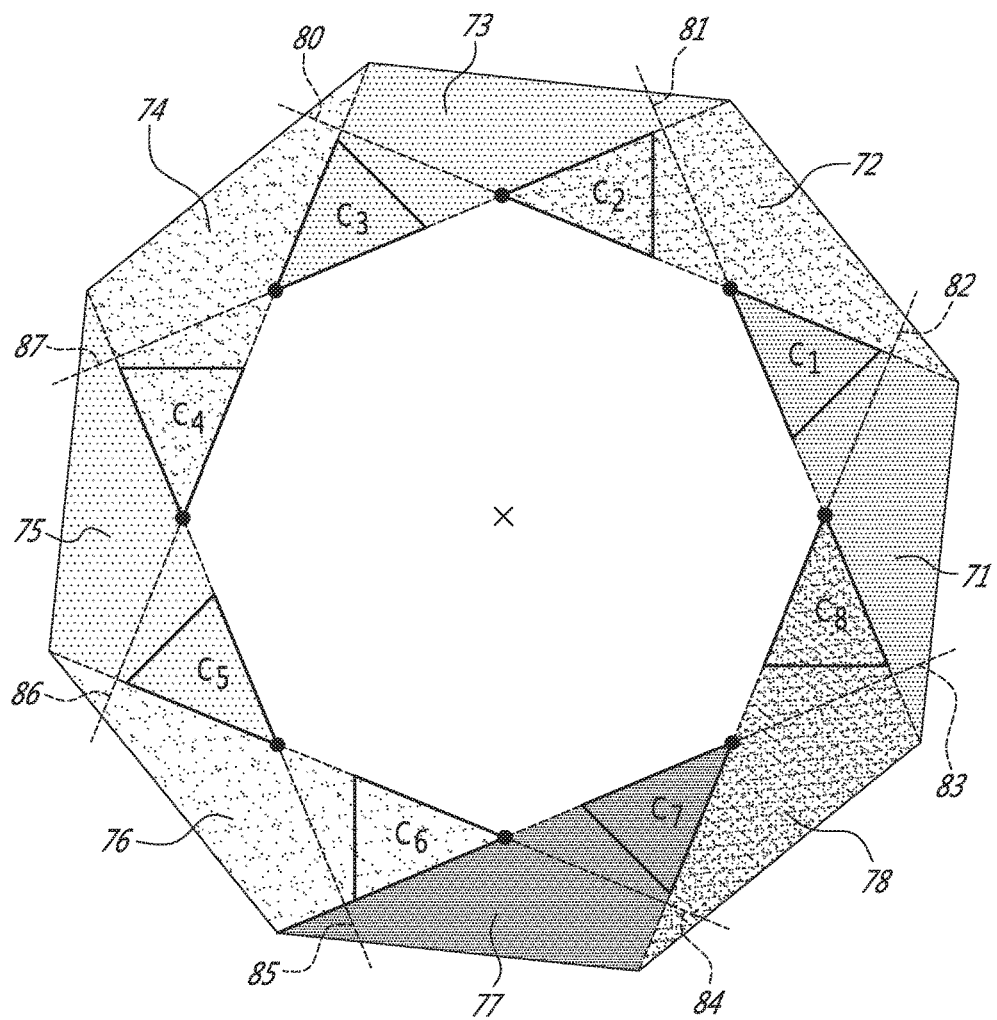
FIG. 10 illustrates an exemplary omnipolar setup for monocular capture using eight cameras.

FIG. 10 is an exemplary embodiment of an eight camera setup for a monocular imaging system (each camera represented using a small disk, which is indicative of the camera's center of projection, and a triangle labelled $c_i$). Parallax may be eliminated horizontally by orienting the eight cameras, C1-C8, as shown. Each camera should have a horizontal field of view (fov) which is greater than or equal to 360 degree divided by the number of cameras used. For example, in FIG. 10, there are eight cameras, each with a fov of at least 45 degrees. The cameras C1-C8 are located on a single horizontal plane (i.e. at a baseline height), equally spaced along a circle (the diameter is not important), and oriented so that the horizontal limits of the field of view of each camera coincide with the lines passing through its center and the center of its neighboring cameras.

Stitching of the images to obtain the 360 degree view is performed using eight distinct field of view regions from cameras C1-C8 respectively. Region 71 corresponds to a 45 degree view from camera C1, region 72 corresponds to a 45 degree view from camera C2, region 73 corresponds to a 45 degree view from camera C3, region 74 corresponds to a 45 degree view from camera C4, region 75 corresponds to a 45 degree view from camera C5, region 76 corresponds to a 45 degree view from camera C6, region 77 corresponds to a 45 degree view from camera C7, and region 78 corresponds to a 45 degree view from camera C8. The views are delimited along eight lines 80, 81, 82, 83, 84, 85, 86, and 87. Line 80 intersects the center point of each one of cameras C2 and C1, line 81 intersects the center point of each one of cameras C1 and C8, line 82 intersects the center point of each one of cameras C8 and C7, and line 83 intersects the center point of each one of cameras C7 and C6, line 84 intersects the center point of each one of cameras C6 and C5, line 85 intersects the center point of each one of cameras C5 and C4, line 86 intersects the center point of each one of cameras C4 and C3, and line 87 intersects the center point of each one of cameras each one of C3 and C2. These lines 80, 81, 82, 83, 84, 85, 86, and 87 thus pass through the epipolar points of each one of cameras C1-C8 and are chosen as the stitching locations for eight views of 45 degrees each as they represent the point of minimum parallax for each pair of camera.

It should be understood that more or less than eight (8) cameras may be used and the setup of FIG. 10 is exemplary in nature. The field of view for each camera corresponds to 360 degrees/N where N is the number of cameras used. It should also be understood that there is no constraint on the radius of the circle on which lies the cameras. This makes practical the use of large camera equipment.

The systems described herein were tested on two scenes, referred to herein as "Lab" and "Driveway". Both scenes were captured using an omnipolar setup using three (3) cameras with fisheye lenses lying on a circle with a diameter of about 12 cm. For both scenes, the camera setup was fixed on a rail on the ground to produce a displacement of about 1.5 m while a person is walking by.

For the Lab scene, a camera setup composed of three Prosilica 1380 cameras of 1360×1024 pixel resolution, each with a Fujinon C-mount fisheye lens was tested. The distance between the lens centers from about 7.5 cm to 10.5 cm was varied. Omnistereo field of views were cut so that camera lenses cannot be seen. It was observed that using a smaller baseline reduces the field of view compared to using a larger baseline. Vertical parallax was adjusted so that the ceiling above the cameras was correctly aligned, i.e. setting $Z_s$ to a distance of about 2.4 m.

The Driveway scene was shot with three (3) Canon HFS11 cameras of 1920×1090 pixel resolution, each with an Opteka Vortex fisheye lens. Camera clocks were synchronized using the Logic Application Control Bus System (LANC) protocol. The distance between the lens centers was about 10.5 cm. Vertical parallax was adjusted to align the electrical wires above the cameras ($Z_s$=6 m). Due to the high curvature of the lenses, large occlusions can be visible in the produced omnistereo images unless the field of view is cut significantly. It was observed that, because an odd number of cameras was used, these occlusions create monocular regions at different locations in the left and right images.

Applications for the systems described herein range from omnistereo cinema to providing stereo immersion for systems like Google Street View™. It should be noted that the present invention can be carried out as a method, can be embodied in a system, or a non-transitory computer readable medium. The embodiments of the invention described above are intended to be exemplary only. The scope of the invention is therefore intended to be limited solely by the scope of the appended claims.

The invention claimed is:

1. A method for generating a substantially 360 degree view from images taken from a plurality of cameras, the method comprising:
   capturing N input images from N cameras fixed at a baseline height substantially equidistantly about a circle in an omnipolar camera setup where N≥3, the cameras having ultra wide angle lenses oriented in a common direction, where every visible point surrounding the setup is capturable in stereo by at least two cameras;
   defining two epipolar lines per field of view from the cameras, the epipolar lines passing through a center point of each one of the cameras and a center point of two neighboring cameras and forming a total of N epipolar lines, to divide the field of view of each one of the cameras into four parts;
   stitching together image portions from each one of the cameras along vertical stitching planes passing through the epipolar lines to remove horizontal misalignments induced by parallax at stitching seams by, for each one of the cameras, selecting a first one of the four parts for a left eye view and a second one of the four parts for a right eye view;
   removing, from image portions, regions corresponding to a visible camera using deviations performed along the epipolar lines;
   forming a first output image for a left eye omnistereo view of substantially 360 degrees by stitching together the first one of the four parts from each one of the fields of view, the first output image composed of N image portions, one from each of the N input images; and
   forming a second output image for a right eye omnistereo view of substantially 360 degrees by stitching together the second one of the four parts from each one of the fields of view, the second output image composed of N image portions, one from each of the N input images, the second one of the four parts corresponding to a 180° rotation of the first one of the four parts.

2. The method of claim 1, further comprising projecting the left eye view and right eye view together to create a depth perception.

3. The method of claim 1, wherein capturing the N input images comprises capturing dynamic images.

4. The method of claim 1, wherein capturing the N input images comprises capturing the N input images from the plurality of cameras simultaneously at any given time.

5. The method of claim 1, wherein the four parts dividing the field of view of each one of the cameras each correspond to 360 degrees/N.

6. The method of claim 1,
   wherein the first one of the four parts comprises a first plurality of points viewed from a first camera positioned counter-clockwise from a first line of sight between a center of the circle and the first plurality of points; and
   wherein the second one of the four parts comprises a second plurality of points viewed from a second camera positioned clockwise from a second line of sight between the center of the circle and the second plurality of points.

7. The method of claim 2, further comprising formatting the left and right eye views for display in a spherical view.

8. The method of claim 2, further comprising formatting the left and right eye views for display in a rectilinear view.

9. The method of claim 2, further comprising formatting the left and right eye views for display in a cylindrical view.

10. The method of claim 2, further comprising formatting the left and right eye views for display by encoding the left and right eye views as anaglyphs.

11. The method of claim 2, further comprising formatting the left and right eye views for display on a head-mounted display.

* * * * *